US012456009B2

(12) United States Patent
Kataoka et al.

(10) Patent No.: US 12,456,009 B2
(45) Date of Patent: Oct. 28, 2025

(54) NON-TRANSITORY COMPUTER-READABLE RECORDING MEDIUM, INFORMATION PROCESSING METHOD, AND INFORMATION PROCESSING APPARATUS

(71) Applicant: Fujitsu Limited, Kawasaki (JP)

(72) Inventors: Masahiro Kataoka, Kamakura (JP); Shouji Iwamoto, Yamato (JP); Kenji Kawana, Numazu (JP)

(73) Assignee: Fujitsu Limited, Kawasaki (JP)

( * ) Notice: Subject to any disclaimer, the term of this patent is extended or adjusted under 35 U.S.C. 154(b) by 326 days.

(21) Appl. No.: 18/115,007

(22) Filed: Feb. 28, 2023

(65) Prior Publication Data
US 2023/0205993 A1 Jun. 29, 2023

Related U.S. Application Data

(63) Continuation of application No. PCT/JP2020/040875, filed on Oct. 30, 2020.

(51) Int. Cl.
*G06F 40/30* (2020.01)
*G06F 40/268* (2020.01)

(52) U.S. Cl.
CPC ............ *G06F 40/268* (2020.01); *G06F 40/30* (2020.01)

(58) Field of Classification Search
CPC ...... G06F 40/268; G06F 40/30; G06F 40/216; G06F 40/247; G06F 40/284
See application file for complete search history.

(56) References Cited

U.S. PATENT DOCUMENTS 8,024,331 B2 * 9/2011 Calistri-Yeh ............ G06F 16/36
707/758
2018/0026650 A1 * 1/2018 Ideuchi .................. G06F 40/30
341/50

(Continued)

FOREIGN PATENT DOCUMENTS

CN 103970729 A * 8/2014
JP 2015-22398 A 2/2015
(Continued)

OTHER PUBLICATIONS

Australian Office Action issued Oct. 11, 2023 in the corresponding Australian Patent Application No. 2020474963, 3 pages.
(Continued)

*Primary Examiner* — Abul K Azad
(74) *Attorney, Agent, or Firm* — XSENSUS LLP

(57) ABSTRACT

A non-transitory computer-readable recording medium has stored therein an information processing program that causes a computer to execute a process including separating input text into a plurality of words, by performing a morpheme analysis on the input text identifying, from among the plurality of words contained in the input text, a polysemous word and a semantic division of the polysemous word, based on a co-occurrence rate table defining co-occurrence rates between polysemous words distinguished according to semantic divisions thereof and categories of words and based on the plurality of words contained in the input text, and assigning a vector corresponding to the semantic division of the polysemous word, to the polysemous word contained in the input text.

9 Claims, 23 Drawing Sheets

(56) References Cited

U.S. PATENT DOCUMENTS

| | | | |
|---|---|---|---|
| 2020/0125804 A1* | 4/2020 | Onoue | G06F 40/30 |
| 2021/0142006 A1* | 5/2021 | Kataoka | G06F 40/30 |
| 2022/0188513 A1* | 6/2022 | Kitamura | G06F 40/279 |
| 2022/0284185 A1* | 9/2022 | Kataoka | G06F 40/247 |

FOREIGN PATENT DOCUMENTS

| | | |
|---|---|---|
| JP | 2018-206263 A | 12/2018 |
| JP | 2020140514 A | 9/2020 |
| WO | 2020/021609 A1 | 1/2020 |

OTHER PUBLICATIONS

International Search Report and Written Opinion mailed on Jan. 26, 2021, received for PCT Application PCT/JP2020/040875, filed on Oct. 30, 2020, 16 pages including English Translation.

Guthrie et al., "Subject-Dependent Co-Occurrence and Word Sense Disambiguation", 29th Annual Meeting of the Association for Computational Lingusitics, Association for Computational Lingusistics, Jun. 30, 1991, pp. 146-152.

Hashimoto et al., "Acquisition of word embedding vector using Poincare embedding", Presentation of the 24th annual conference of Association for Natural Language Processing, Mar. 5, 2018, pp. 1187-1190 (9 pages including English Translation).

Extended European search report issued on Oct. 9, 2023, in corresponding European patent Application No. 20959877.0, 7 pages.

David Richard Hope, "Graph-Based Approaches to Word Sense Induction", Dec. 1, 2014, Retrieved from the Internet: URL:http://sro.sussex.ac.uk/53254/l/Hope,_ David_Richard.pdf [retrieved on Feb. 11, 2016], total 236 pages.

Japanese Office Action issued Apr. 1, 2025 in corresponding Japanese Patent Application No. 2024-096762, 8 pages.

* cited by examiner

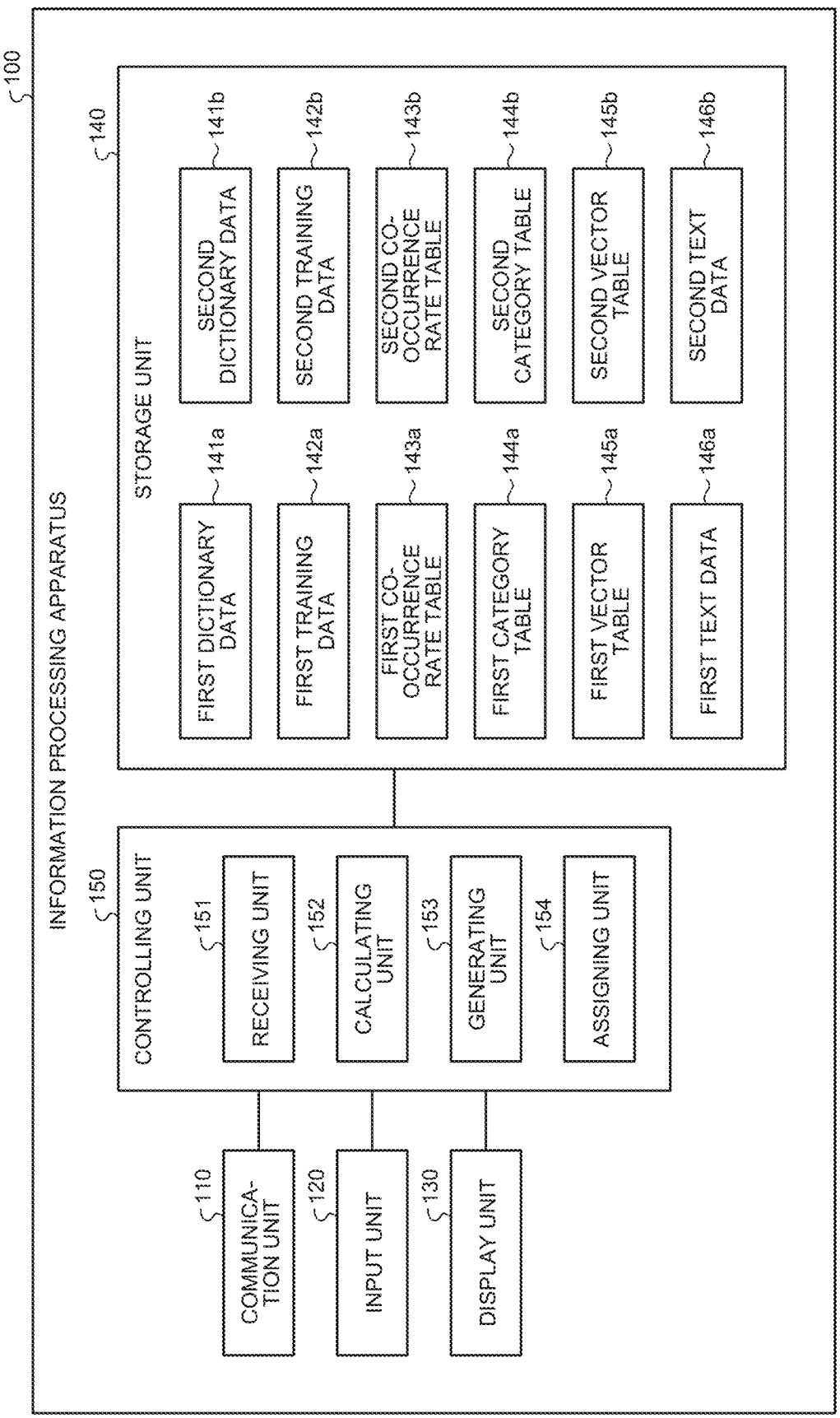

FIG.3

| WORD CHARACTER STRING | PARTS OF SPEECH | CLASSIFICATION | ... | POLYSEMOUS WORD FLAG 141a |
|---|---|---|---|---|
| ISOGASHII | ADJECTIVE | BASE FORM | ... | 0 |
| ISOGASHI | ADJECTIVE | LITERARY LANGUAGE BASE FORM | ... | 0 |
| ... | ... | ... | ... | ... |
| KUDOU | NOUN | SURNAME | ... | 0 |
| ... | ... | ... | ... | ... |
| AMAI (AMAI (1), AMAI (2)) | ADJECTIVE | SENTENCE BASE FORM | ... | 1 |
| ... | ... | ... | ... | ... |

FIG.4

| WORD CHARACTER STRING | PARTS OF SPEECH | CLASSIFICATION | ... | POLYSEMOUS WORD FLAG 141b |
|---|---|---|---|---|
| busy | ADJECTIVE | BASE FORM | ... | 0 |
| ... | ... | ... | ... | ... |
| Mitsubisi UFJ Bank | NOUN | PROPER NOUN | ... | 0 |
| ... | ... | ... | ... | ... |
| cool (cool (1), cool (2)) | ADJECTIVE | BASE FORM | ... | 1 |
| ... | ... | ... | ... | ... |
| take | VERB | BASE FORM | ... | 0 |
| take off | VERB | IDIOMATIC EXPRESSION | ... | 0 |
| take out | VERB | IDIOMATIC EXPRESSION | ... | 0 |
| ... | ... | ... | ... | ... |

Ichigo wa amai (1). Ringo wa amai (1). Okashi wa amai (1).···
Kare no kangae wa amai (2). Kanojo no kangae wa amai (2).
Watashi no kangae wa amai (2).···

This room is cool (1). It is a cool (1) breeze.···Ichiro is cool (2).
He is so cool (2).···The air plane takes off. He takes lunch out of store.···

| POLYSE-MOUS WORD | CO-OCCURRENCE RATES ||||
|---|---|---|---|---|
| | CATEGORY ID: α (FRUITS) | CATEGORY ID: β (SNACKS) | ... CATEGORY ID: η (PEOPLE) | CATEGORY ID: ζ (CONSID-ERATION) |
| ... | ... | ... | ... ... | ... |
| AMAI (1) | 78% | 63% | ... 1% | 2% |
| AMAI (2) | 1% | 2% | ... 81% | 71% |
| ... | ... | ... | ... ... | ... |

| POLYSE-MOUS WORD | CO-OCCURRENCE RATES ||||
|---|---|---|---|---|
| | CATEGORY ID: ε (PLACES) | CATEGORY ID: λ (AIR TEMPERATURE) | ... CATEGORY ID: η (PEOPLE) | CATEGORY ID: ζ (CONSID-ERATION) |
| ... | ... | ... | ... ... | ... |
| cool (1) | 75% | 60% | ... 1% | 2% |
| cool (2) | 1% | 2% | ... 77% | 75% |
| ... | ... | ... | ... ... | ... |

| CATEGORY ID | WORDS |
|---|---|
| α | ICHIGO, RINGO, BUDOU, ··· |
| β | KUKKII, KEEKI, AISU KURIIMU, ··· |
| ··· | ··· |
| η | KARE, KANOJO, OMAE, AITSU, ··· |
| ζ | KANGAE, KIBOU, AIDEA, ··· |

| CATEGORY ID | WORDS |
|---|---|
| ε | room, place, hall, ··· |
| λ | temperature, air, atmosphere, ··· |
| ··· | ··· |
| η | he, she, you, chap, ··· |
| ζ | thought, hope, idea, ··· |

| WORDS (JAPANESE) | WORD VECTORS (200 DIMENSIONS) |
|---|---|
| ... | ... |
| AMAI (1) | Vj1-1, Vj1-2, Vj1-3, ..., Vj1-200 |
| AMAI (2) | Vj2-1, Vj2-2, Vj2-3, ..., Vj2-200 |
| ... | ... |
| ICHIGO | Vj3-1, Vj3-2, Vj3-3, ..., Vj3-200 |
| ... | ... |
| WA | Vj4-1, Vj4-2, Vj4-3, ..., Vj4-200 |
| ... | ... |

| WORDS (ENGLISH) | WORD VECTORS (200 DIMENSIONS) |
|---|---|
| ... | ... |
| cool (1) | Ve1-1, Ve1-2, Ve1-3, ..., Ve1-200 |
| cool (2) | Ve2-1, Ve2-2, Ve2-3, ..., Ve2-200 |
| ... | ... |
| take | Ve3-1, Ve3-2, Ve3-3, ..., Ve3-200 |
| ... | ... |
| take off | Ve4-1, Ve4-2, Ve4-3, ..., Ve4-200 |
| take out | Ve5-1, Ve5-2, Ve5-3, ..., Ve5-200 |
| ... | ... |

FIG.20

```
                                    ╭241
┌─────────────────────────────────┐
│ BASE FILE                       │
│   ···AUGUUUUCCAAGUGC···UGA      │
└─────────────────────────────────┘
```

FIG.21

|         | 4 (0100) | 5 (0101) | 6 (0110) | 7 (0111) |
|---------|----------|----------|----------|----------|
| 0 (0000) | UUU | CUU | AUU | GUU |
| 1 (0001) | UUC | CUC | AUC | GUC |
| 2 (0010) | UUA | CUA | AUA | GUA |
| 3 (0011) | UUG | CUG | AUG | GUG |
| 4 (0100) | UCU | CCU | ACU | GCU |
| 5 (0101) | UCC | CCC | ACC | GCC |
| 6 (0110) | UCA | CCA | ACA | GCA |
| 7 (0111) | UCG | CCG | ACG | GCG |
| 8 (1000) | UAU | CAU | AAU | GAU |
| 9 (1001) | UAC | CAC | AAC | GAC |
| A (1010) | UAA | CAA | AAA | GAA |
| B (1011) | UAG | CAG | AAG | GAG |
| C (1100) | UGU | CGU | AGU | GGU |
| D (1101) | UGC | CGC | AGC | GGC |
| E (1110) | UGA | CGA | AGA | GGA |
| F (1111) | UGG | CGG | AGG | GGG |

(table ref: 242)

FIG.24

| PROTEIN INFORMATION ||| AMINO ACID SYMBOL SEQUENCE | CODON SYMBOL SEQUENCE |
|---|---|---|---|---|
| SYM-BOL | GROUP | NAME | | |
| 8000h | COLLAGEN | TYPE I COLLAGEN | 02h46h59h⋯⋯⋯⋯03h | 02h63h78h⋯⋯⋯⋯03h |
| 8001h | COLLAGEN | TYPE II COLLAGEN | 02h52h4Eh⋯⋯⋯⋯03h | 02h52h79h⋯⋯⋯⋯03h |
| 8002h | COLLAGEN | TYPE III COLLAGEN | 02h43h⋯⋯⋯⋯03h | 02h66h⋯⋯⋯⋯03h |
| 8003h | COLLAGEN | TYPE IV COLLAGEN | ⋯ | ⋯ |
| 8004h | COLLAGEN | TYPE V COLLAGE | ⋯ | ⋯ |
| 8005h | COLLAGEN | TYPE VI COLLAGEN | ⋯ | ⋯ |
| 8006h | COLLAGEN | TYPE VII COLLAGEN | ⋯ | ⋯ |
| 8007h | COLLAGEN | TYPE VIII COLLAGEN | ⋯ | ⋯ |
| 8008h | COLLAGEN | TYPE IX COLLAGEN | ⋯ | ⋯ |
| 8009h | COLLAGEN | TYPE X COLLAGEN | ⋯ | ⋯ |
| 800Ah | COLLAGEN | TYPE XI COLLAGEN | ⋯ | ⋯ |
| 800Bh | COLLAGEN | TYPE XV COLLAGEN | ⋯ | ⋯ |
| 800Ch | COLLAGEN | TYPE XVII COLLAGEN | ⋯ | ⋯ |
| 800Dh | COLLAGEN | TYPE XVIII COLLAGEN | ⋯ | ⋯ |
| 800Eh | KERATIN | ACTIN FILAMENT | ⋯ | ⋯ |
| 800Fh | KERATIN | KERATIN FILAMENT | ⋯ | ⋯ |
| 8010h | KERATIN | NEURO FILAMENT | ⋯ | ⋯ |
| 8011h | KERATIN | DESMIN | ⋯ | ⋯ |
| 8012h | KERATIN | VIMENTIN | ⋯ | ⋯ |
| 8013h | KERATIN | α TUBULIN | ⋯ | ⋯ |
| 8014h | KERATIN | β TUBULIN | ⋯ | ⋯ |
| 8015h | KERATIN | γ TUBULIN | ⋯ | ⋯ |
| 8016h | KERATIN | δ TUBULIN | ⋯ | ⋯ |

| SYMBOL | PROTEIN INFORMATION | | CO-OCCURRENCE RATES | | | | |
|---|---|---|---|---|---|---|---|
| | GROUP | NAME | CATEGORY ID: CL1 | CATEGORY ID: CL2 | ... | CATEGORY ID: CL3 | CATEGORY ID: CL4 |
| 8000h | COLLAGEN | TYPE I COLLAGEN | 78% | 63% | ... | 1% | 2% |
| 8001h | COLLAGEN | TYPE II COLLAGEN | 67% | 89% | ... | 5% | 7% |
| 8002h | COLLAGEN | TYPE III COLLAGEN | 81% | 71% | ... | 4% | 2% |
| ... | ... | | ... | | ... | | |
| 800Eh | KERATIN | ACTIN FILAMENT | 1% | 2% | ... | 79% | 62% |
| 800Fh | KERATIN | KERATIN FILAMENT | 6% | 13% | ... | 83% | 69% |
| 8010h | KERATIN | NEURO FILAMENT | 8% | 6% | ... | 93% | 87% |
| 8011h | KERATIN | DESMIN | 5% | 9% | ... | 73% | 84% |
| ... | | | | | | | |

| CATEGORY ID | PROTEIN (SYMBOLS) |
|---|---|
| CL1 | 8000h, 8001h, 8002h, ⋯ |
| CL2 | 800Eh, 800Fh, 8010h, ⋯ |
| CL3 | 802Ah, 802Bh, 802Ch, ⋯ |
| CL4 | 8225h, 8325h, 8330h, ⋯ |
| ⋯ | ⋯ |

| PROTEIN (SYMBOL) | WORD VECTORS (200 DIMENSIONS) |
|---|---|
| 800h | Vp1-1, Vp1-2, Vp1-3, ⋯, Vp1-200 |
| 8001h | Vp2-1, Vp2-2, Vp2-3, ⋯, Vp2-200 |
| 8002h | Vp3-1, Vp3-2, Vp3-3, ⋯, Vp3-200 |
| ⋯ | ⋯ |

251

NON-TRANSITORY COMPUTER-READABLE RECORDING MEDIUM, INFORMATION PROCESSING METHOD, AND INFORMATION PROCESSING APPARATUS

CROSS-REFERENCE TO RELATED APPLICATION(S)

This application is a continuation application of International Application PCT/JP2020/040875 filed on Oct. 30, 2020 and designating U.S., the entire contents of which are incorporated herein by reference.

FIELD

The present invention relates to an information processing program and the like.

BACKGROUND

Examples of conventionally-known techniques by which a group of sentences or a sentence (hereinafter, simply "sentence") is analyzed so as to express the words contained in the sentence with vectors include Word2Vec (a Skip-Gram Model or a Continuous Bag of Words (CBOW) model). This technique has a characteristic where words that are expressed differently but have similar meanings have similar vector values. In the following explanations, vectors of words will be referred to as "word vectors". For example, in Word2Vec, word vectors are expressed in 200 dimensions.

It is possible to calculate a vector of a sentence, by integrating together the word vectors of a plurality of words structuring the sentence. In the following explanations, the vector of a sentence will be referred to as a "sentence vector". This technique has a characteristic where sentences that are expressed differently but have similar meanings have similar sentence vector values. For example, the meaning of the Japanese sentence "Watashi wa ringo ga suki desu (I like apples)." is the same as the meaning of the Japanese sentence "Ringo wa watashi no koubutsu desu (Apples are my favorite food).". Thus, the sentence vector of "Watashi wa ringo ga suki desu." is similar to the sentence vector of "Ringo wa watashi no koubutsu desu.".

As a technique for assigning a word vector (a numerical value) to each word, a technique called Poincare embeddings is also known. According to this technique, words and categories thereof are defined in advance, so that words are embedded in a Poincare space, on the basis of the defined categories. After that, in the Poincare space, a vector corresponding to each of the embedded words is assigned to the word.

Patent Literature 1: Japanese Laid-open Patent Publication No. 2015-22398
Patent Literature 2: Japanese Laid-open Patent Publication No. 2018-206263

However, the conventional techniques described above have a problem where it is not possible to assign appropriate vectors to a plurality of semantics (meanings) of a polysemous word, which may lower precision levels of analyses and translations using the vectors.

For example, the word "cool (1)" in an English sentence "Ichiro is cool." and the word "cool (2)" in another sentence "This room is cool." have different semantics (meanings). In these examples, the numerals in the parentheses are used for the sake of convenience to distinguish the word "cool" having the mutually-different meanings.

If the same vector (numerical value) were assigned to "cool (1)" and to "cool (2)" in the above, it would not be possible to appropriately assign sentence vectors to the sentence "Ichiro is cool." and to the sentence "This room is cool.".

To cope with this situation, one possible idea is, with respect to a plurality of semantics (meanings) of a polysemous word, to set a word vector in advance for each semantic division. In that situation, estimation is made by using a Hidden Markov Model (HMM) or the like so as to determine whether the word "cool" in the English sentence "Ichiro is cool." corresponds to "cool (1)" or "cool (2)". However, setting HMM parameters with all the semantic divisions of polysemous words would involve registering a huge amount of information and would seem unrealistic. In addition, it is also desirable to take a countermeasure for vectors of idiomatic expressions such as "take off" or "take out" that have different meanings, similarly to polysemous words, when combined with prepositions having high frequency of appearance called "stop words".

SUMMARY

According to an aspect of the embodiment of the invention, A non-transitory computer-readable recording medium has stored therein an information processing program that causes a computer to execute a process including separating input text into a plurality of words, by performing a morpheme analysis on the input text; identifying, from among the plurality of words contained in the input text, a polysemous word and a semantic division of the polysemous word, based on a co-occurrence rate table defining co-occurrence rates between polysemous words distinguished according to semantic divisions thereof and categories of words and based on the plurality of words contained in the input text; and assigning a vector corresponding to the semantic division of the polysemous word, to the polysemous word contained in the input text.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a functional block diagram illustrating a configuration of the information processing apparatus according to the first embodiment.

FIG. 3 is a table illustrating an example of a data structure of first dictionary data.

FIG. 4 is a table illustrating an example of a data structure of second dictionary data.

FIG. 5 is a drawing illustrating an example of first training data.

FIG. 6 is a drawing illustrating an example of second training data.

FIG. 7 is a table illustrating an example of a data structure of a first co-occurrence rate table.

FIG. 8 is a table illustrating an example of a data structure of a second co-occurrence rate table.

FIG. 9 is a table illustrating an example of a data structure of a first category table.

FIG. 10 is a table illustrating an example of a data structure of a second category table.

FIG. 11 is a table illustrating an example of a data structure of a first vector table.

FIG. 12 is a table illustrating an example of a data structure of a second vector table.

FIG. 20 is a drawing illustrating an example of a data structure of a base file.

FIG. 21 is a table illustrating an example of a data structure of a conversion table.

FIG. 24 is a table illustrating an example of a data structure of a protein dictionary.

FIG. 25 is a table illustrating an example of a data structure of a protein HMM.

FIG. 28 is a table illustrating an example of a data structure of a category table.

FIG. 29 is a table illustrating an example of a data structure of a vector table.

DESCRIPTION OF EMBODIMENTS

Exemplary embodiments of an information processing program, an information processing method, and an information processing apparatus disclosed herein will be explained in detail below, on the basis of the drawings. The present invention is not limited by these embodiments.

First Embodiment

Figure 1:
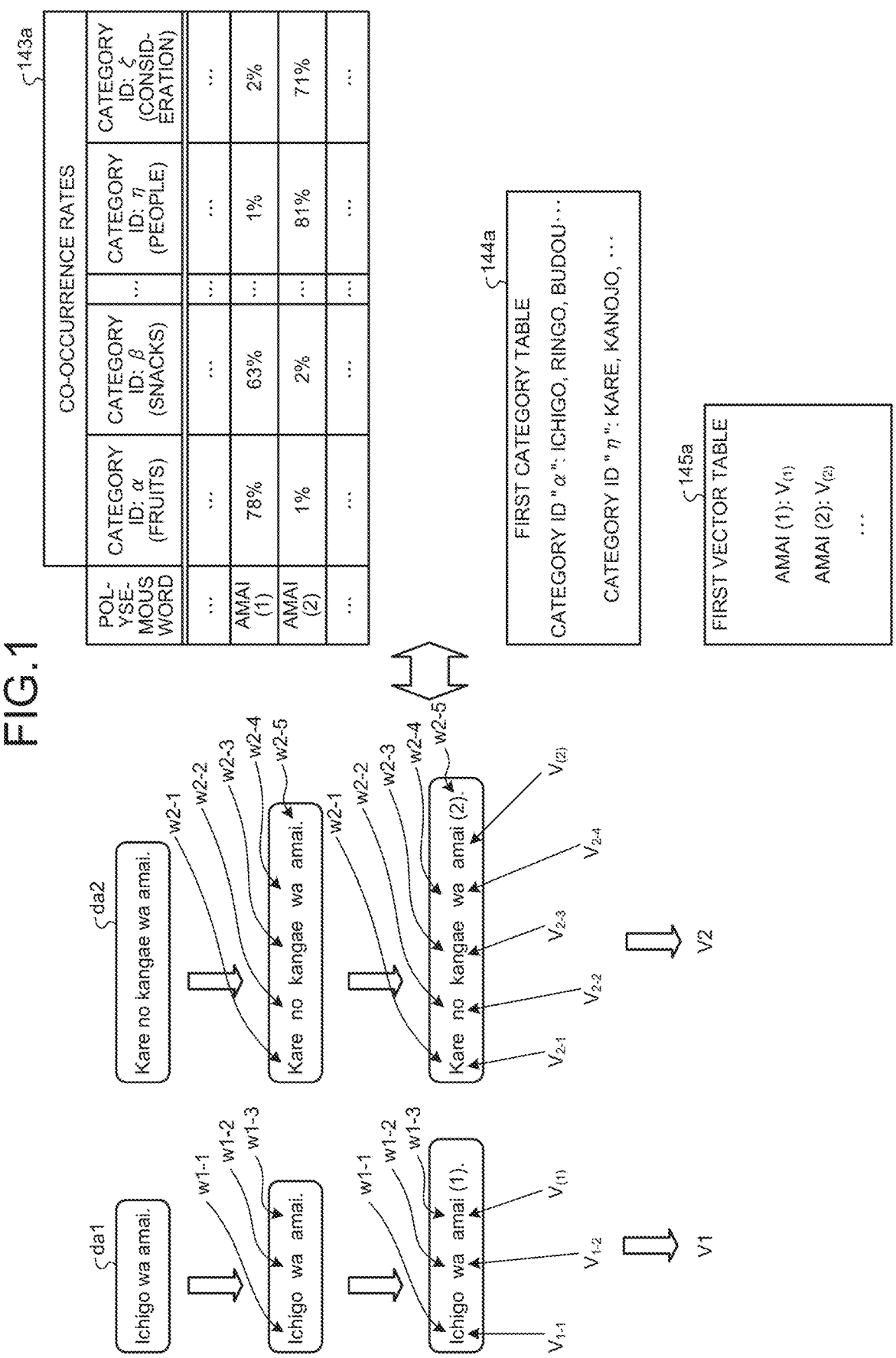
FIG. 1 is a diagram for explaining a process performed by an information processing apparatus according to a first embodiment of the present disclosure.

FIG. 1 is a diagram for explaining a process performed by an information processing apparatus according to a first embodiment of the present disclosure. With reference to FIG. 1, an example will be explained in which the information processing apparatus assigns sentence vectors to input text da1 and da2 in Japanese. For example, the sentence in the input text da1 reads "Ichigo wa amai. (Strawberries are sweet.)". The sentence in the input text da2 reads "Kare no kangae wa amai. (His thought is naïve.)".

In the present embodiment, it is assumed that the information processing apparatus is configured to perform processes by using a first co-occurrence rate table 143a, a first category table 144a, and a first vector table 145a.

The first co-occurrence rate table 143a keeps therein a relationship of co-occurrence rates between polysemous words distinguished according to semantic divisions thereof and categories of words. In the first embodiment, words being polysemous words are each distinguished by using a set made up of the word and a numeral in parentheses. In FIG. 1, the polysemous word "amai" is distinguished as "amai (1)" and "amai (2)".

The meaning of "amai (1)" is defined as "having a sugary taste such as that of sugar or honey". It is indicated that, in sentences containing "amai (1)", words identified with the category ID "a" have a co-occurrence rate of "78%". It is indicated that, in sentences containing "amai (1)", words identified with the category ID "$" have a co-occurrence rate of "63%". It is indicated that, in sentences containing "amai (1)", words identified with the category ID "η" have a co-occurrence rate of "1%". It is indicated that, in sentences containing "amai (1)", words identified with the category ID "Q" have a co-occurrence rate of "2%".

In a sentence containing the polysemous word "amai", when another co-occurring word is a word corresponding to the category ID "a" or "β", the information processing apparatus identifies the polysemous word "amai" as the polysemous word "amai (1)".

The meaning of "amai (2)" is defined as "lacking in sternness". It is indicated that, in sentences containing "amai (2)", words identified with the category ID "a" have a co-occurrence rate of "1.". It is indicated that, in sentences containing "amai (2)", words identified with the category ID "ζ" have a co-occurrence rate of "2%". It is indicated that, in sentences containing "amai (2)", words identified with the category ID "η" have a co-occurrence rate of "81%". It is indicated that, in sentences containing "amai (2)", words identified with the category ID "Q" have a co-occurrence rate of "71".

In a sentence containing the polysemous word "amai", when another co-occurring word is a word corresponding to the category ID "rj" or "Q", the information processing apparatus identifies the polysemous word "amai" as the polysemous word "amai (2)".

The first category table 144a is a table keeping therein categories ID and words in correspondence with each other. The words are classified under categories IDs, on the basis of a thesaurus. For example, fruits such as strawberries, apples, and grapes are classified under the category ID "a". Words related to people such as he or she are classified under the category ID "q". Although further explanations will be omitted, other words are also each classified under one of the category IDs.

The first vector table 145a keeps therein word vectors to be assigned to words. As for polysemous words, a word vector is set with respect to each semantic division. It is assumed that the word vector of each word is calculated in advance by using the conventional technique called Poincare embeddings.

A process performed by the information processing apparatus to assign a sentence vector to the input text da1 will be explained. By performing a morpheme analysis thereon, the information processing apparatus separates the input text da1 into words w1-1, w1-2, and w1-3. Among the words w1-1, w1-2, and w1-3, the word w1-3 is a polysemous word. For example, the information processing apparatus identifies the polysemous word by using dictionary data.

By comparing the words w1-1 and w1-2 co-occurring with the word w1-3, with the first category table 144a, the information processing apparatus identifies the category ID "a" of the word w1-1. Explanations about the category ID of the word w1-2 will be omitted.

By comparing the relationship between the polysemous word "amai" corresponding to the word w1-3 and the category ID "a" of the co-occurring word w1-1, with the first co-occurrence rate table 143a, the information processing apparatus identifies that the word w1-3 corresponds to the polysemous word "amai (1)".

The information processing apparatus compares the words w1-1, w1-2, and w1-3 with the first vector table 145a and assigns word vectors $V_{1-1}$, $V_{1-2}$, and $V_{(1)}$ corresponding to the words w1-1, w1-2, and w1-3 to these words, respectively. In this situation, the word vector assigned to the word w1-3 is the unique word vector $V_{(1)}$ related to "amai (1)". By integrating the word vectors $V_{1-1}$, $V_{1-2}$, and $V_1$) together, the information processing apparatus calculates a sentence vector "V1". The information processing apparatus assigns the sentence vector "V1" to the input text da1.

A process performed by the information processing apparatus to assign a sentence vector to the input text da2 will be explained. By performing a morpheme analysis thereon, the information processing apparatus separates the input text da2 into words w2-1, w2-2, w2-3, w2-4, and w2-5. Among the words w2-1, w2-2, w2-3, w2-4, and w2-5, the word w2-5 is a polysemous word. For example, the information processing apparatus identifies the polysemous word by using dictionary data.

The information processing apparatus compares the words w2-1, w2-2, w2-3, and w2-4 co-occurring with the word w2-5 with the first category table 144a and identifies the category ID "η" of the word w2-1. Explanations about category IDs of the words w2-2 to w2-4 will be omitted.

By comparing the relationship between the polysemous word "amai" corresponding to the word w2-5 and the category ID "η" of the co-occurring word w2-1, with the first co-occurrence rate table 143a, the information processing apparatus identifies that the word w2-5 corresponds to the polysemous word "amai (2)".

The information processing apparatus compares the words w2-1 to w2-5 with the first vector table 145a and assigns word vectors $V_{2-1}$, $V_{2-2}$, $V_{2-3}$, $V_{2-4}$, and $V_{(2)}$ corresponding to the words w2-1 to w2-5 to these words, respectively. In this situation, the word vector assigned to the word w2-5 is the unique word vector $V_{(2)}$ related to "amai (2)". By integrating the word vectors $V_{2-1}$, $V_{2-2}$, $V_{2-3}$, $V_{2-4}$, and $V_{(2)}$ together, the information processing apparatus calculates a sentence vector "V2". The information processing apparatus assigns the sentence vector "V2" to the input text da2.

As explained above, by using the first co-occurrence rate table 143a defining the co-occurrence rates between the polysemous words distinguished according to the semantic divisions thereof and the categories of the other words, the information processing apparatus according to the first embodiment identifies the meanings of the polysemous words contained in the input text and assigns the word vectors corresponding to the meanings of the polysemous words. In this manner, when the input text contains polysemous words, because the word vectors are assigned in correspondence with the meanings of the polysemous words, it is possible to increase precision levels of the sentence vectors corresponding to the input text.

Further, on the basis of the thesaurus, the information processing apparatus classifies the words under the category IDs in advance, so as to perform the processes by using the first co-occurrence rate table 143a defining the co-occurrence rates between the polysemous words distinguished according to the semantic divisions thereof and the category IDs. Consequently, in comparison to conventional HMMs defining a co-occurrence rate for each word, it is possible to make the data amount of the first co-occurrence rate table 143a smaller.

Next, a configuration of the information processing apparatus according to the first embodiment will be explained. FIG. 2 is a functional block diagram illustrating the configuration of the information processing apparatus according to the first embodiment. As illustrated in FIG. 2, an information processing apparatus 100 in the present example includes a communication unit 110, an input unit 120, a display unit 130, a storage unit 140, and a controlling unit 150.

The communication unit 110 is connected to an external apparatus or the like in a wired or wireless manner and transmits and receives information to and from the external apparatus or the like. For example, the communication unit 110 may be realized by using a Network Interface Card (NIC) or the like. The communication unit 110 may be connected to a network (not illustrated).

The input unit 120 is an input apparatus that inputs various types of information to the information processing apparatus 100. The input unit 120 corresponds to a keyboard, a mouse, a touch panel, and/or the like.

The display unit 130 is a display apparatus that displays information output from the controlling unit 150. The display unit 130 corresponds to a liquid crystal display, an organic Electroluminescence (EL) display, a touch panel, or the like.

The storage unit 140 has first dictionary data 141a, second dictionary data 141b, first training data 142a, second training data 142b, the first co-occurrence rate table 143a, and a second co-occurrence rate table 143b. The storage unit 140 has the first category table 144a, a second category table 144b, the first vector table 145a, and a second vector table 145b. The storage unit 140 has first text data 146a and second text data 146b. For example, the storage unit 140 is realized by using a storage apparatus like a semiconductor memory element such as a Random Access Memory (RAM) or a flash memory, or a hard disk, an optical disk, or the like.

The first dictionary data 141a is dictionary data obtained by expanding the format of a word dictionary in Japanese and has registered therein, in addition to Japanese words, polysemous words, idiomatic expressions, field-specific terms, and the like in Japanese. FIG. 3 is a table illustrating an example of a data structure of the first dictionary data. For example, the first dictionary data 141a keeps word character strings, parts of speech, classifications, polysemous word flags, and the like in correspondence with one another.

Each of the word character strings represents an element (a superficial form) indicating a format of the word actually appearing in a sentence as a character string, while taking into account conjugations and expression variances. Each of the parts of speech indicates the part of speech of the word in a sentence. Each of the classifications indicates the classification of the word in a sentence. Each of the polysemous word flags is a flag indicating whether or not the word character string is a polysemous word. For polysemous words, the polysemous word flag is set to "1". For non-polysemous words, the polysemous word flag is set to "0".

The second dictionary data 141b is dictionary data obtained by expanding the format of a word dictionary in English and has registered therein, in addition to English words, polysemous words, idiomatic expressions, field-specific terms, and the like in English. FIG. 4 is a table illustrating an example of a data structure of the second dictionary data. For example, the second dictionary data 141b keeps word character strings, parts of speech, classifications, polysemous word flags, and the like in correspondence with one another.

Explanations about the word character strings, the parts of speech, the classifications, and the polysemous word flags are the same as those provided with reference to FIG. 3.

The first training data 142a is data used at the time of calculating co-occurrence rates (parameters) in the first co-occurrence rate table 143a related to Japanese. FIG. 5 is a drawing illustrating an example of the first training data. As illustrated in FIG. 5, the first training data 142a contains a plurality of Japanese sentences. Further, among the words contained in the sentences, the words being polysemous words are each distinguished by using a set made up of the word and a numeral in parentheses. Thus, "amai (1)" and "amai (2)" are words belonging to mutually-different semantic divisions.

The second training data 142b is data used at the time of calculating co-occurrence rates (parameters) in the second co-occurrence rate table 143b related to English. FIG. 6 is a drawing illustrating an example of the second training data. As illustrated in FIG. 6, the second training data 142b contains a plurality of English sentences. Further, among the words contained in the sentences, the words being polysemous words are each distinguished by using a set made up of the word and a numeral in parentheses. Thus, "cool (1)" and "cool (2)" are words belonging to mutually-different semantic divisions.

The first co-occurrence rate table 143a keeps therein a relationship of co-occurrence rates between polysemous words (Japanese polysemous words) distinguished according to the semantic divisions thereof and the categories of the words (the Japanese words). FIG. 7 is a table illustrating an example of a data structure of the first co-occurrence rate table. As illustrated in FIG. 7, the polysemous words having mutually the same word character string are distinguished from each other by using a set made up of the word and a numeral in parentheses. Explanations about the first co-occurrence rate table 143a in FIG. 7 are the same as those about the first co-occurrence rate table 143a provided with reference to FIG. 1.

The second co-occurrence rate table 143b keeps therein a relationship of co-occurrence rates between polysemous words (English polysemous words) distinguished according to the semantic divisions thereof and the categories of the words (the English words). FIG. 8 is a table illustrating an example of a data structure of the second co-occurrence rate table. As illustrated in FIG. 8, the polysemous words having mutually the same word character string are distinguished from each other by using a set made up of the word and a numeral in parentheses.

The meaning of "cool (1)" is defined as "being of a low temperature". It is indicated that, in sentences containing "cool (1)", words identified with the category ID "ε" have a co-occurrence rate of "75%". It is indicated that, in sentences containing "cool (1)", words identified with the category ID "λ" have a co-occurrence rate of "60'.". It is indicated that, in sentences containing "cool (1)", words identified with the category ID "η" have a co-occurrence rate of "1%". It is indicated that, in sentences containing "cool (1)", words identified with the category ID "ζ" have a co-occurrence rate of "2".

In a sentence containing the polysemous word "cool", when another co-occurring word is a word corresponding to the category ID "8" or "λ", the information processing apparatus 100 identifies the polysemous word "cool" as the polysemous word "cool (1)".

The meaning of "cool (2)" is defined as "being calm or composed". It is indicated that, in sentences containing "cool (2)", words identified with the category ID "ε" have a co-occurrence rate of "1%". It is indicated that, in sentences containing "cool (2)", words identified with the category ID "λ" have a co-occurrence rate of "2%". It is indicated that, in sentences containing "cool (2)", words identified with the category ID "η" have a co-occurrence rate of "77%". It is indicated that, in sentences containing "cool (2)", words identified with the category ID "ζ" have a co-occurrence rate of "750".

In a sentence containing the polysemous word "cool", when another co-occurring word is a word corresponding to the category ID "η" or "ζ", the information processing apparatus 100 identifies the polysemous word "cool" as the polysemous word "cool (2)".

The first category table 144a is a table keeping therein category IDs and Japanese words in correspondence with each other. FIG. 9 is a table illustrating an example of a data structure of the first category table. As illustrated in FIG. 9, the first category table 144a keeps therein the category IDs and the words in correspondence with each other. Each of the category IDs is information identifying a different one of the categories in one-to-one correspondence. It is assumed that the words are classified under the category IDs on the basis of a thesaurus.

For examples, the words "ichigo (strawberry)", "ringo (apple)", "budou (grape)", and the like are classified under category ID "α". The words "kukkii (cookie)", "keeki (cake)", "aisu kuriimu (ice cream)", and the like are classified under the category ID "β". The words "kare (he)", "kanojo (she)", "omae (you)", "aitsu (that person)", and the like are classified under the category ID "rj". The words "kangae (thought)", "kibou (hope)", and "aidea (idea)", and the like are classified under the category "(".

The second category table 144b is a table keeping therein category IDs and English words in correspondence with each other. FIG. 10 is a table illustrating an example of a data structure of the second category table. As illustrated in FIG. 10, the second category table 144b keeps therein the category IDs and the words in correspondence with each other. Each of the category IDs is information identifying a different one of the categories in one-to-one correspondence. It is assumed that the words are classified under the category IDs on the basis of a thesaurus.

For example, the words "room", "place", "hall", and the like are classified under the category "s". The words "temperature", "air", "atmosphere", and the like are classified under the category "λ". The words "he", "she", "you", "chap", and the like are classified under the category "η". The words "thought", "hope", "idea", and the like are classified under the category "ζ".

The first vector table 145a defines word vectors of Japanese words. Further, with polysemous words, mutually-different word vectors are kept in correspondence, according to semantic divisions thereof. FIG. 11 is a table illustrating an example of a data structure of the first vector table 145a. As illustrated in FIG. 11, the first vector table 145a keeps therein the words and the word vectors in correspondence with each other. The word vectors are expressed in 200 dimensions.

For example, with the polysemous word "amai", word vectors are kept in correspondence according to semantic divisions thereof. With "amai (1)", word vectors (200 dimensions) "Vj1-1 to Vj1-200" are kept in correspondence. With "amai (2)", word vectors (200 dimensions) "Vj2-1 to Vj2-200" are kept in correspondence.

The second vector table 145b defines word vectors of English words. Further, with polysemous words, mutually-different word vectors are kept in correspondence according to semantic divisions thereof. As for idiomatic expressions, one word vector is kept in correspondence with a plurality of words structuring each of the idiomatic expressions. FIG. 12 is a table illustrating an example of a data structure of the second vector table 145b. As illustrated in FIG. 12, the second vector table 145b keeps therein the words and the word vectors in correspondence with each other. The word vectors are expressed in 200 dimensions.

For example, with the polysemous word "cool", word vectors are kept in correspondence according to semantic divisions thereof. With "cool (1)", word vectors (200 dimensions) "Ve1-1 to Ve1-200" are kept in correspondence. With "cool (2)", word vectors (200 dimensions) "Ve2-1 to Ve2-200" are kept in correspondence.

Further, with the idiomatic expression "take off", one word vector (200 dimensions) "Ve4-1 to Ve4-200" are kept in correspondence. With the idiomatic expression "take out", one word vector (200 dimensions) "Ve5-1 to Ve5-200" are kept in correspondence.

It is assumed that the word vectors explained with reference to FIGS. 11 and 12 are calculated in advance by using the technique called Poincare embeddings.

According to Poincare embeddings, a vector is assigned according to the position of being embedded in a Poincare space. Further, there is a characteristic where the more similar pieces of information are, the closer position the pieces of information are embedded in. Consequently, pieces of basic information classified under mutually the same common concept are embedded in positions close to each other within a Poincare space and thus have similar vectors assigned thereto. For example, because the Japanese word "amai (1)" and the English word "sweet" have similar meanings, similar word vectors are assigned thereto.

The first text data 146a is data containing a plurality of Japanese sentences (input text). The controlling unit 150 (explained later) performs a process of assigning sentence vectors to the input text contained in the first text data 146a.

The second text data 146b is data containing a plurality of English sentences (input text). The controlling unit 150 (explained later) assigns sentence vectors to the input text contained in the second text data 146b.

The controlling unit 150 includes a receiving unit 151, a calculating unit 152, a generating unit 153, and an assigning unit 154. The controlling unit 150 is realized by using, for example, a Central Processing Unit (CPU) or a Micro Processing Unit (MPU). Further, the controlling unit 150 may be implemented by an integrated circuit such as an Application Specific Integrated Circuit (ASIC) or a Field Programmable Gate Array (FPGA), for example.

The receiving unit 151 receives various types of data from an external apparatus or the like via a network and stores the received data into the storage unit 140. For example, the receiving unit 151 receives the first dictionary data 141a, the second dictionary data 141b, the first training data 142a, the second training data 142b, the first category table 144a, and the second category table 144b and further stores the received data and tables into the storage unit 140.

The calculating unit 152 calculates the word vectors of words, idiomatic expressions, field-specific terms, and the like, by carrying out the Poincare embeddings. On the basis of a technique described in Non-Patent Literature "Valentin Khrulkovl et al. 'Hyperbolic Image Embeddings', Cornell University, Apr. 3, 2019", or the like, the calculating unit 152 calculates the word vectors of the words, the idiomatic expressions, the field-specific terms, and the like and further registers the calculated word vectors into the first vector table 145a and the second vector table 145b.

Further, in the situation where the word vectors of the words are calculated in advance by an external apparatus configured to carry out the Poincare embeddings, the receiving unit 151 receives the first vector table 145a and the second vector table 145b from the external apparatus and further stores the received tables into the storage unit 140.

The generating unit 153 is a processing unit that generates the first co-occurrence rate table 143a and the second co-occurrence rate table 143b. The generating unit 153 stores the first co-occurrence rate table 143a and the second co-occurrence rate table 143b that were generated, into the storage unit 140.

An example of the process performed by the generating unit 153 to generate the first co-occurrence rate table 143a will be explained. The generating unit 153 separates the Japanese sentences contained in the first training data 142a into a plurality of words, by performing a morpheme analysis thereon. The generating unit 153 identifies polysemous words from among the plurality of words resulting from the separating process. As explained with reference to FIG. 5, in the first training data 142a, each of the polysemous words is identifiably defined by using a set made up of the word and a numeral in parentheses. In the following sections, a process performed by the generating unit 153 to calculate a co-occurrence rate of the polysemous word "amai (1)" will be explained.

By detecting words co-occurring with the polysemous word "amai (1)" and comparing the detected words with the first category table 144a, the generating unit 153 identifies category IDs of the words co-occurring with the polysemous word "amai (1)". In this situation, each of the words co-occurring with the polysemous word may be a word contained in the same sentence with the polysemous word, may be a word positioned before the same sentence with the polysemous word, or may be a word positioned after the same sentence with the polysemous word.

For example, let us discuss an example in which the polysemous word "amai (1)" appears $M_A$ times in the first training data 142a. Further, let us assume that the category ID "α" of the words co-occurring with the polysemous word "amai (1)" appears $L_A$ times. In this situation, the co-occurrence rate between the polysemous word "amai (1)" and the category ID "α" is calculated as "$L_A/M_A \times 100$". The generating unit 153 generates the first co-occurrence rate table 143a by repeatedly performing the process described above with respect to each of the polysemous words (each of the sets made up of a word and a numeral in parentheses).

Next, an example of a process performed by the generating unit 153 to generate the second co-occurrence rate table 143b will be explained. The generating unit 153 separates the English sentences contained in the second training data 142b into a plurality of words, by performing a morpheme analysis thereon. The generating unit 153 identifies polysemous words from among the plurality of words resulting from the separating process. As explained with reference to FIG. 6, in the second training data 142b, each of the polysemous words is identifiably defined by using a set made up of the word and a numeral in parentheses. In the following sections, a process performed by the generating unit 153 to calculate a co-occurrence rate of the polysemous word "cool (1)" will be explained.

By detecting the words co-occurring with the polysemous word "cool (1)" and comparing the detected words with the second category table 144b, the generating unit 153 identifies category IDs of the words co-occurring with the polysemous word "cool (1)". In this situation, each of the words co-occurring with the polysemous word may be a word contained in the same sentence with the polysemous word, may be a word positioned before the same sentence with the polysemous word, or may be a word positioned after the same sentence with the polysemous word.

For example, let us discuss an example in which the polysemous word "cool (1)" appears Me times in the second training data 142b. Further, let us assume that the category ID "α" of the words co-occurring with the polysemous word "cool (1)" appears $L_B$ times. In this situation, the co-occurrence rate between the polysemous word "cool (1)" and the category ID "α" is calculated as "$L_B/M_B \times 100$". The generating unit 153 generates the second co-occurrence rate table 143b by repeatedly performing the process described above with respect to each of the polysemous words (each of the sets made up of a word and a numeral in parentheses).

The assigning unit 154 assigns sentence vectors to the Japanese input text contained in the first text data 146a. Further, the assigning unit 154 assigns sentence vectors to the English input text contained in the second text data 146b.

Figure 13:
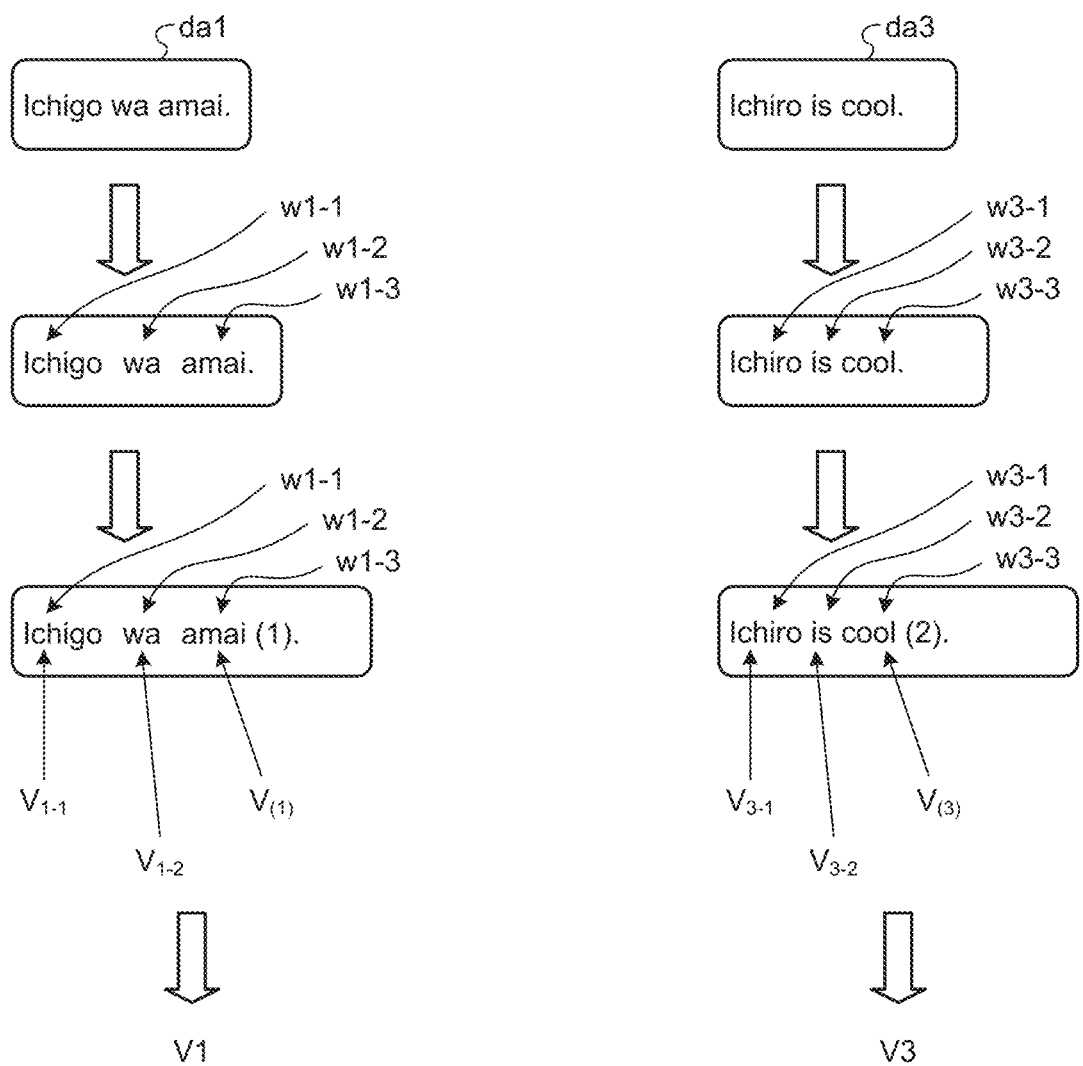
FIG. 13 is a diagram for explaining a process performed by an assigning unit according to the first embodiment.

FIG. 13 is a diagram for explaining a process performed by the assigning unit according to the first embodiment. To begin with, a process performed by the assigning unit 154 to assign a sentence vector to a Japanese sentence (the input text da1) contained in the first text data 146a will be explained.

The assigning unit 154 separates the input text da1 into words w1-1, w1-2, and w1-3, by performing a morpheme analysis thereon. Among the words w1-1, w1-2, and w1-3, the word w1-3 is a polysemous word. The assigning unit 154 identifies the polysemous word "amai" by using the first dictionary data 141a.

By comparing the words w1-1 and w1-2 co-occurring with the word w1-3 with the first category table 144a, the assigning unit 154 identifies the category ID "a (fruits)" of the word w1-1. Explanations about the category ID of the word w1-2 will be omitted.

The assigning unit 154 identifies a co-occurrence rate with respect to each of the semantic divisions, by comparing the relationship between the polysemous word "amai" corresponding to the word w1-3 and the category ID "α" of the co-occurring word w1-1 with the first co-occurrence rate table 143a. In FIG. 7, the co-occurrence rate between the polysemous word "amai (1)" and the category ID "α" is "785". In contrast, the co-occurrence rate between the polysemous word "amai (2)" and the category ID "α" is "1%". Because the co-occurrence rate between "amai (1)" and the category ID "α" is the largest, the assigning unit 154 identifies that the word w1-3 corresponds to the polysemous word "amai (1)".

By comparing the words w1-1, w1-2, and w1-3 with the first vector table 145a, the assigning unit 154 assigns the word vectors $V_{1-1}$, $V_{1-2}$, and $V_{(1)}$ corresponding to the words w1-1, w1-2, and w1-3, to these words, respectively. Although not illustrated, it is assumed that the word vectors $V_{1-1}$, $V_{1-2}$, and $V_{(1)}$, are vectors expressed in 200 dimensions.

The assigning unit 154 calculates the sentence vector "V1" by integrating together the word vectors $V_{1-1}$, $V_{1-2}$, and $V_{1-2}$. The assigning unit 154 assigns the sentence vector "V1" to the input text da1. The assigning unit 154 also assigns sentence vectors to the other input text contained in the first text data 146a, by repeatedly performing the process described above.

Next, a process performed by the assigning unit 154 to assign a sentence vector to an English sentence (the input text da3) contained in the second text data 146b will be explained.

The assigning unit 154 separates the input text da3 into words w3-1, w3-2, and w3-3, by performing a morpheme analysis thereon. Among the words w3-1, w3-2, and w3-3, the word w3-3 is a polysemous word. The assigning unit 154 identifies the polysemous word "cool" by using the second dictionary data 141b.

The assigning unit 154 compares the words w3-1 and w3-2 co-occurring with the word w3-3 with the second category table 144b. For example, the category ID of the word w3-1 is identified as "η (people)". Explanations about the category ID of the word w3-2 will be omitted.

The assigning unit 154 identifies a co-occurrence rate with respect to each of the semantic divisions, by comparing the relationship between the polysemous word "cool" corresponding to the word w3-3 and the category ID "η" of the co-occurring word w3-1 with the second co-occurrence rate table 143b. In FIG. 8, the co-occurrence rate between the polysemous word "cool (1)" and the category ID "η" is "1.". In contrast, the co-occurrence rate between the polysemous word "cool (2)" and the category ID "η" is "77;". Because the co-occurrence rate between "cool (2)" and the category ID "rj" is the largest, the assigning unit 154 identifies that the word w3-3 corresponds to the polysemous word "cool (2)".

By comparing the words w3-1, w3-2, and w3-3 with the second vector table 145b, the assigning unit 154 assigns word vectors $V_{3-1}$, $V_{3-2}$, and $V_{(3)}$ corresponding to the words w3-1, w3-2, and w3-3, to these words, respectively. Although not illustrated, it is assumed that the word vectors $V_{3-1}$, $V_{3-2}$, and $V_{(3)}$, are vectors expressed in 200 dimensions.

The assigning unit 154 calculates a sentence vector "V3" by integrating together the word vectors $V_{3-1}$, $V_{3-2}$, and $V_{(3)}$. The assigning unit 154 assigns the sentence vector "V3" to the input text da3. The assigning unit 154 also assigns sentence vectors to the other input text contained in the second text data 146b, by repeatedly performing the process described above.

Figure 14:
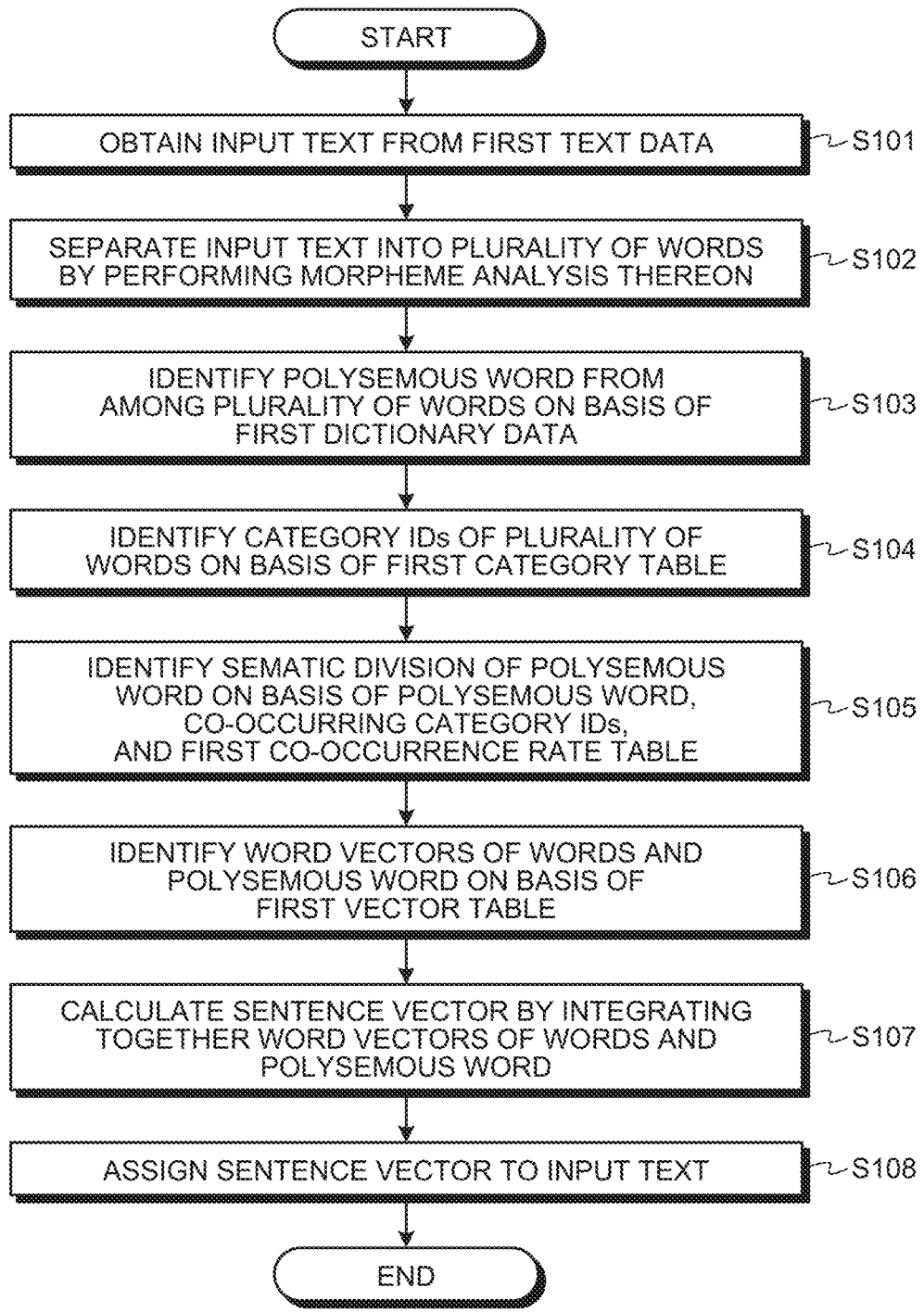
FIG. 14 is a first flowchart illustrating an example of a processing procedure of the information processing apparatus according to the first embodiment.

Next, an example of a processing procedure of the information processing apparatus 100 according to the first embodiment will be explained. FIG. 14 is a first flowchart illustrating the example of the processing procedure of the information processing apparatus according to the first embodiment. As illustrated in FIG. 14, the assigning unit 154 of the information processing apparatus 100 obtains input text from the first text data 146a (step S101).

The assigning unit 154 separates the input text into a plurality of words, by performing a morpheme analysis thereon (step S102). On the basis of the first dictionary data 141a, the assigning unit 154 identifies a polysemous word from among the plurality of words (step S103). On the basis of the first category table 144a, the assigning unit 154 identifies the category IDs of the plurality of words (step S104).

On the basis of the polysemous word, the co-occurring category IDs, and the first co-occurrence rate table 143a, the assigning unit 154 identifies a semantic division of the polysemous word (step S105). On the basis of the first vector table 145a, the assigning unit 154 identifies the word vectors of the words and the polysemous word (step S106).

By integrating together the word vectors of the words and the polysemous word, the assigning unit 154 calculates a sentence vector (step S107). The assigning unit 154 assigns the sentence vector to the input text (step S108).

Figure 15:
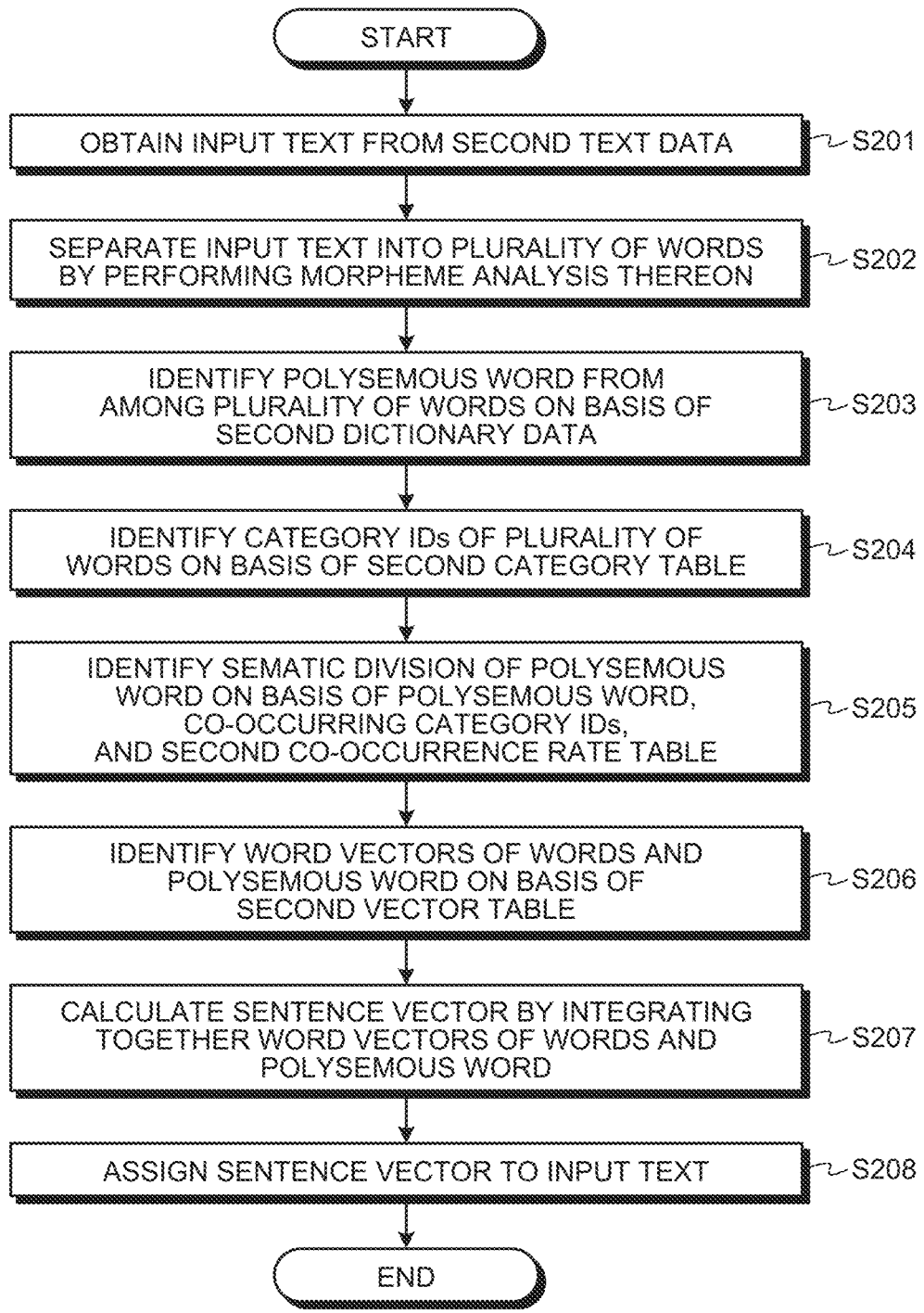
FIG. 15 is a second flowchart illustrating another example of the processing procedure of the information processing apparatus according to the first embodiment.

FIG. 15 is a second flowchart illustrating another example of the processing procedure of the information processing apparatus according to the first embodiment. As illustrated in FIG. 15, the assigning unit 154 of the information processing apparatus 100 obtains input text from the second text data 146b (step S201).

The assigning unit 154 separates the input text into a plurality of words, by performing a morpheme analysis thereon (step S202). On the basis of the second dictionary data 141b, the assigning unit 154 identifies a polysemous word from among the plurality of words (step S203). On the basis of the second category table 144b, the assigning unit 154 identifies the category IDs of the plurality of words (step S204).

On the basis of the polysemous word, the co-occurring category IDs, and the second co-occurrence rate table 143b, the assigning unit 154 identifies a semantic division of the polysemous word (step S205). On the basis of the second vector table 145b, the assigning unit 154 identifies the word vectors of the words and the polysemous word (step S206).

By integrating together the word vectors of the words and the polysemous word, the assigning unit 154 calculates a sentence vector (step S207). The assigning unit 154 assigns the sentence vector to the input text (step S208).

Next, advantageous effects of the information processing apparatus 100 according to the first embodiment will be explained. The information processing apparatus 100 identifies the meaning of the polysemous word contained in the input text, by using the first co-occurrence rate table 143a (the second co-occurrence rate table 143b) defining the co-occurrence rates between the polysemous words distinguished according to the semantic divisions thereof and the categories of the other words. On the basis of the identified result, the information processing apparatus 100 assigns the word vectors corresponding to the meaning of the polysemous word. In this manner, when the input text contains a polysemous word, the word vector is assigned in accordance with the meaning of the polysemous word. It is therefore possible to increase precision levels of the sentence vectors corresponding to the input text.

On the basis of the thesaurus, the information processing apparatus 100 classifies the words under the category IDs in advance and performs the process while using the first co-occurrence rate table 143a (the second co-occurrence rate table 143b) defining the co-occurrence rates between the polysemous words distinguished according to the semantic divisions thereof and the category IDs. Consequently, in comparison to the conventional HMMs defining a co-occurrence rate for each word, it is possible to make the data amount of the first co-occurrence rate table 143a (the second co-occurrence rate table 143b) smaller. In addition, by using the HMM kept in correspondence with the categories, it is possible to reduce the number of times of referencing on average and to thus make the processing faster.

The information processing apparatus 100 calculates the word vector of each of the words by carrying out the Poincare embeddings. As a result, it is possible to assign the word vectors corresponding to the meanings. Further, to each of the idiomatic expressions each structured with a plurality of words, it is also possible to assign a single word vector corresponding to the meaning thereof.

Next, a first example of other processes performed by the information processing apparatus 100 described in the first embodiment will be explained. The information processing apparatus 100 may generate a machine training model that translates Japanese into English, by carrying out Recurrent Neural Network (RNN) machine training while using training data in which a first sentence in Japanese is kept in correspondence with a second sentence obtained by translating the first sentence into English.

For example, the information processing apparatus 100 assigns a word vector to each of the words, by performing a morpheme analysis on the first sentence contained in the training data. Further, by performing the process described above, the information processing apparatus 100 assigns, when the first sentence contains a polysemous word, a word vector corresponding to a semantic division of the polysemous word.

Similarly, the information processing apparatus 100 assigns a word vector to each of the words, by performing a morpheme analysis on the second sentence contained in the training data. Further, by performing the process described above, the information processing apparatus 100 assigns, when the second sentence contains a polysemous word, a word vector corresponding to a semantic division of the polysemous word.

The information processing apparatus 100 carries out the RNN machine training, by using a relationship between the word vectors assigned to the words in the first sentence and the word vectors assigned to the words in the second sentence.

Next, a second example of the other processes performed by the information processing apparatus 100 described in the first embodiment will be explained. The word vectors in the first vector table 145a and the second vector table 145b explained in the first embodiment were the vectors in 200 dimensions; however, it is also acceptable to convert the word vectors into word vectors expressed in lower dimensions (e.g., three dimensions) by carrying out dimension compression.

Figure 16:
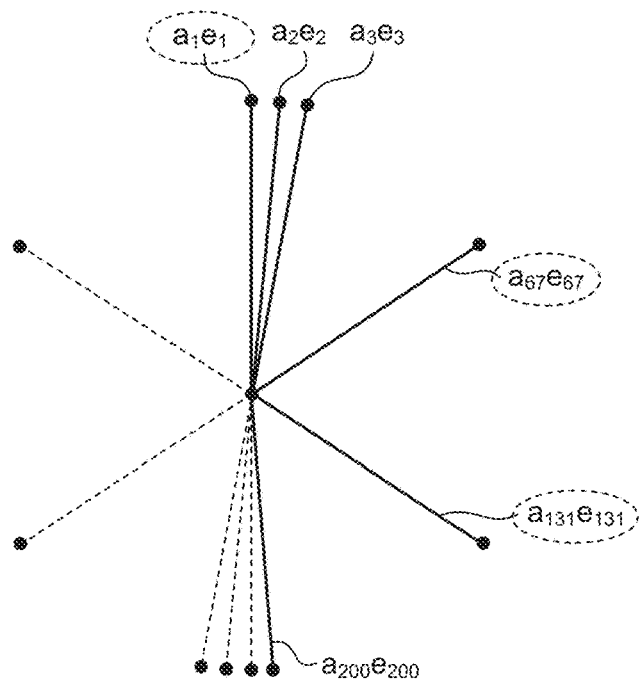
FIG. 16 is a first chart for explaining dimension compression of vectors.
Figure 17:
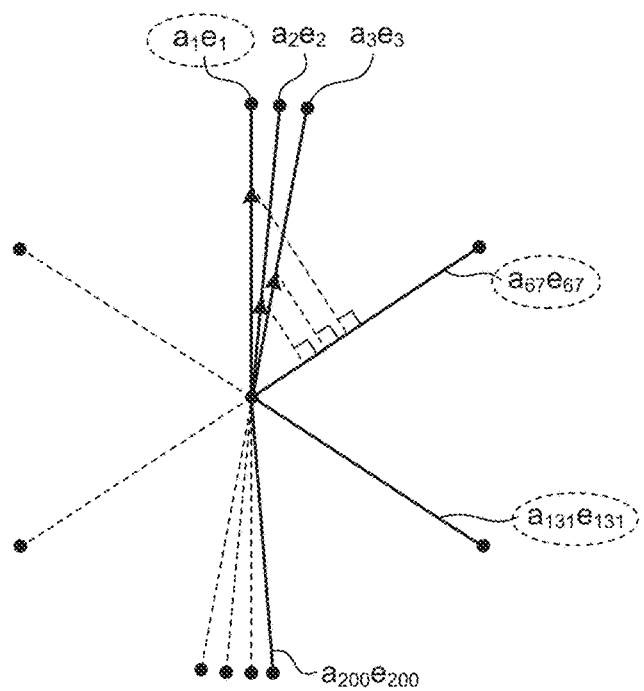
FIG. 17 is a second chart for explaining the dimension compression of the vectors.

FIGS. 16 and 17 are charts for explaining dimension compression of the vectors. FIG. 16 will be explained. The calculating unit 152 of the information processing apparatus 100 arranges 200 base vectors $a_i e_i$ (where i=1 to 200) that have been component-resolved into 200 dimensions, in a circular (semi-circular) formation in an equally distributed manner. In this situation, it is possible to define a relationship between vector A before the component resolution and the base vectors $a_i e_i$ resulting from the component resolution, by using Expression (1) presented below.

$$A = \sum_{i=1}^{200} a_i e_i \qquad (1)$$

FIG. 17 will be explained. With respect to a base vector $a_1e_1$, the calculating unit 152 calculates the value of the base vector $a_1e_1$, by performing an orthogonal transform on each of the rest of the base vectors $a_2e_2$ to $a_{200}e_{200}$ and integrating together the values of the base vectors $a_2e2$ to $a_{200}e_{200}$ resulting from the orthogonal transform.

With respect to a base vector $a_{67}e_{67}$, the calculating unit 152 calculates the value of the base vector $a_{67}e_{67}$, by performing an orthogonal transform on each of the rest of the base vectors $a_1e_1$ (the solid line+the arrow), $a_2e_2$, $a_3e_3$ to $a_{66}e_{66}$, and $a_{68}e_{68}$ to $a_{200}e_{200}$ and integrating together the values of the base vectors $a_1e_1$ to $a_{66}e_{66}$ and $a_{66}e_{66}$ to $a_{200}e_{200}$ resulting from the orthogonal transform.

With respect to a base vector $a_{131}e_{131}$, the calculating unit 152 calculates the value of the base vector $a_{131}e_{131}$, by performing an orthogonal transform on each of the rest of the base vectors $a_1e_1$ to $a_{130}e_{130}$ and $a_{132}e_{132}$ to $a_{200}e_{200}$ and integrating together the values of the base vectors $a_1e_1$ to $a_{130}e_{130}$ and $a_{132}e_{132}$ to $a_{200}e_{200}$ resulting from the orthogonal transform.

The calculating unit 152 determines "the value of the base vector $a_1e_1$, the value of the base vector $a_{67}e_{67}$, and the value of the base vector $a_{131}e_{131}$", as the components of a compressed vector resulting from the dimension compression performed on the vectors in 200 dimensions. The calculating unit 152 performs the same calculation on the other dimensions. In this situation, the calculating unit 152 may carry out the dimension compression by using a Karhunen-Loeve (KL) expansion or the like. The calculating unit 152 carries out the dimension compression on the word vectors, by carrying out the dimension compression described above on each of the word vectors in the first vector table 145a and the second vector table 145b.

By carrying out the dimension compression as described above, it is possible to reduce the calculation amount related to the word vectors, in comparison to the situation where the word vectors in 200 dimensions are handled. In this situation, the word vectors resulting from the dimension compression are not reversible into 200 dimensions, but may be restored.

Second Embodiment

An information processing apparatus according to a second embodiment handles a "base file". The base file is information in which a plurality of base symbols such as A, G, C, and T (or U) are arranged in a sequence. A set of three bases called a codon corresponds to a predetermined amino acid. Further, a set of a plurality of sequential amino acids corresponds to a predetermined protein. A set of a plurality of proteins corresponds to a primary structure. Furthermore, a set of a plurality of primary structures forms a higher order structure.

Figure 18:
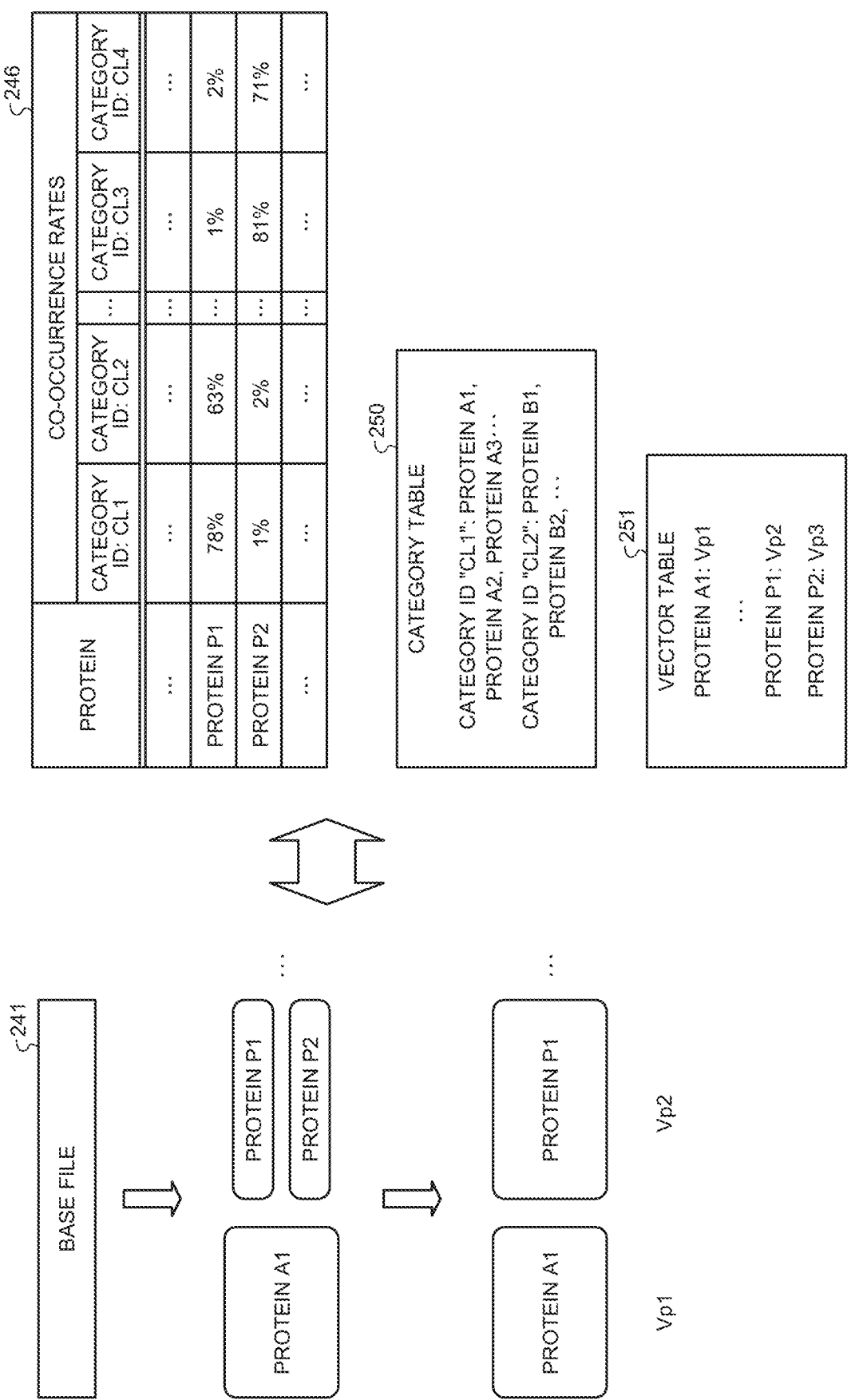
FIG. 18 is a diagram for explaining a process performed by an information processing apparatus according to a second embodiment of the present disclosure.

In the second embodiment, an example will be explained in which vectors are assigned to proteins. FIG. 18 is a diagram for explaining a process performed by the information processing apparatus according to the second embodiment. In FIG. 18, it is assumed that the information processing apparatus is configured to perform a process by using a protein HMM 246, a category table 250, and a vector table 251.

The protein HMM 246 keeps therein a relationship of co-occurrence rates between proteins and protein categories. For example, it is indicated that a co-occurrence rate between a protein P1 and the proteins identified by a category ID "CL1" is "78%". It is indicated that a co-occurrence rate between the protein P1 and the proteins identified by a category ID "CL2" is "63%". It is indicated that a co-occurrence rate between the protein P1 and the proteins identified by a category ID "CL3" is "1%". It is indicated that a co-occurrence rate between the protein P1 and the proteins identified by a category ID "CL4" is "2%".

It is indicated that a co-occurrence rate between a protein P2 and the proteins identified by the category ID "CL1" is "1%". It is indicated that a co-occurrence rate between the protein P2 and the proteins identified by the category ID "CL2" is "2%". It is indicated that a co-occurrence rate between the protein P2 and the proteins identified by the category ID "CL3" is "81%". It is indicated that a co-occurrence rate between the protein P2 and the proteins identified by the category ID "CL4" is "71%".

The category table 250 is a table keeping therein the category IDs and the proteins in correspondence with each other. Proteins having mutually the same characteristics are classified under mutually the same category ID. A protein A1, a protein A2, a protein A3, and the like are classified under the category ID "CL1". A protein B1, a protein B2, a protein B3, and the like are classified under the category ID "CL2". Although not illustrated, "Thrombin", "Chymotrypsin", and "Nattokinase" are classified under mutually the same category ID.

The vector table 251 keeps therein vectors to be assigned to the proteins. It is assumed that a vector of each of the proteins is calculated in advance by using the conventional technique called Poincare embeddings.

The information processing apparatus 100 identifies the types of proteins, by identifying breaks between the proteins starting from the head of a base file 241, while using various types of dictionary data. The various types of dictionary data will be explained later. In the process of identifying the types of the proteins, the information processing apparatus may encounter a plurality of candidates for the type of a protein.

In the example illustrated in FIG. 18, as the candidates for the protein that follows the protein A1, the protein maybe a protein P1 or may be a protein P2.

On the basis of the protein A1 and the category table 250, the information processing apparatus identifies the category ID "CL1" of the protein A1. On the basis of the protein HMM 246, the information processing apparatus identifies the co-occurrence rate of "78%" between the category ID "CL1" and the protein P1. On the basis of the protein HMM 246, the information processing apparatus identifies the co-occurrence rate of "1%" between the category ID "CL1" and the protein P2.

Because the co-occurrence rate between the category ID "CL1" and the protein P1 is larger than the co-occurrence rate between the category ID "CL1" and the protein P2, the information processing apparatus identifies the protein P1 as the protein that follows the protein A1. Also for the proteins that follow the protein P1, the information processing apparatus repeatedly performs the process of identifying the types of the proteins, on the basis of the co-occurrence rates.

After having finished identifying the proteins, the information processing apparatus assigns vectors to the proteins, on the basis of the vector table 251. In the example in FIG. 18, the information processing apparatus assigns a vector Vp1 to the protein A1 and assigns a vector Vp2 to the protein P1. By integrating together the vectors of the proteins contained in the base file 241, the information processing apparatus calculates a vector of the base file 241.

As explained above, on the basis of the protein HMM 246 defining the co-occurrence rates between the proteins and the protein categories, the information processing apparatus according to the second embodiment is identifies the types of the proteins contained in the base file 241 and assigns the vectors thereto. As a result, even when it is not possible to identify the types of the proteins contained in the base file 241 in one-to-one correspondence, it is possible to identify the accurate types of proteins by using the co-occurrence rates and to thus assign the appropriate vectors.

Further, the information processing apparatus classifies the proteins under the category IDs in advance on the basis of similarities among the proteins, so as to perform the process by using the protein HMM 246 defining the co-occurrence rates between the proteins and the category IDs. Consequently, in comparison to the situation where a co-occurrence rate is defined for each protein of HMMs, it is possible to make the data amount of the protein HMM 246 smaller.

Figure 19:
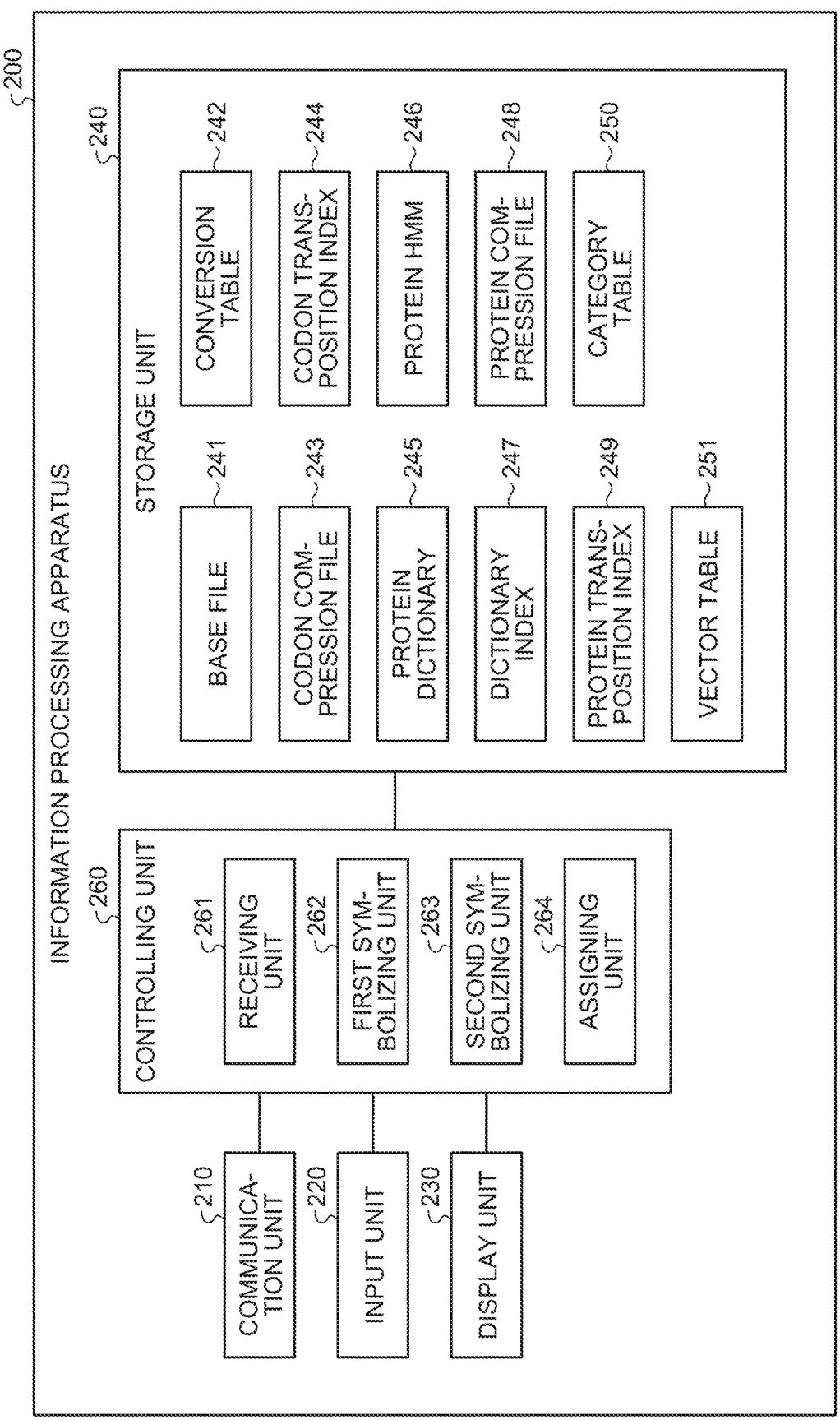
FIG. 19 is a functional block diagram illustrating a configuration of the information processing apparatus according to the second embodiment.

Next, a configuration of the information processing apparatus according to the second embodiment will be explained. FIG. 19 is a functional block diagram illustrating the configuration of the information processing apparatus according to the second embodiment. As illustrated in FIG. 19, an information processing apparatus 200 includes a communication unit 210, an input unit 220, a display unit 230, a storage unit 240, and a controlling unit 260.

The communication unit 210 is connected to an external apparatus or the like in a wired or wireless manner and transmits and receives information to and from the external apparatus or the like. For example, the communication unit 210 may be realized by using an NIC or the like. The communication unit 210 may be connected to a network (not illustrated).

The input unit 220 is an input apparatus that inputs various types of information to the information processing apparatus 200. The input unit 220 corresponds to a keyboard, a mouse, a touch panel, and/or the like.

The display unit 230 is a display apparatus that displays information output from the controlling unit 260. The display unit 230 corresponds to a liquid crystal display, an organic EL display, a touch panel, or the like.

The storage unit 240 has the base file 241, a conversion table 242, a codon compression file 243, a codon transposition index 244, a protein dictionary 245, and the protein HMM 246. Further, the storage unit 240 has a dictionary index 247, a protein compression file 248, a protein transposition index 249, the category table 250, and the vector table 251. For example, the storage unit 240 is realized by using a storage apparatus like a semiconductor memory element such as a RAM or a flash memory, or a hard disk, an optical disk, or the like.

The base file 241 is a file keeping therein information in which a plurality of bases are arranged in a sequence. FIG. 20 is a drawing illustrating an example of a data structure of the base file. There are four types of bases for Deoxyribonucleic Acid (DNA) and Ribonucleic Acid (RNA) for which symbols "A", "G", "C", and "T" or "U" are used. A sequence of three bases forms one block that is referred to as one of 64 types of codons and determines one of 20 types of amino acids. Each of the amino acids is identified with the symbols of "A" to "Y".

The conversion table 242 is a table keeping therein codons and symbols corresponding to the codons in correspondence with each other. FIG. 21 is a table illustrating an example of a data structure of the conversion table. As illustrated in FIG. 21, the codons and the symbols are kept in correspondence with each other. For example, the symbol of a codon "UUU" is "40h(01000000)", where "h" denotes a hexadecimal notation.

Figure 22:
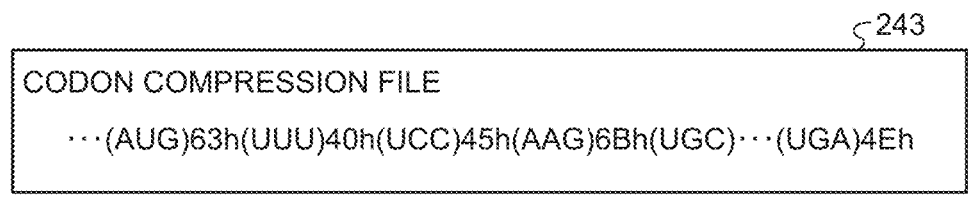
FIG. 22 is a drawing illustrating an example of a data structure of a codon compression file.

The codon compression file 243 is a file keeping therein information in which a plurality of symbolized codons are arranged in a sequence. FIG. 22 is a drawing illustrating an example of a data structure of the codon compression file. As illustrated in FIG. 22, the codon compression file 243 is represented by information in which symbols in units of codons are arranged in a sequence. In the second embodiment, for the sake of convenience, the bases (a codon) before the symbolization are indicated in parentheses next to each of the symbols. For example, although the codon "AUG" is converted into the symbol "63h", the symbol resulting from the conversion will be written as "(AUG)63h", where "h" denotes the hexadecimal notation.

Figure 23:
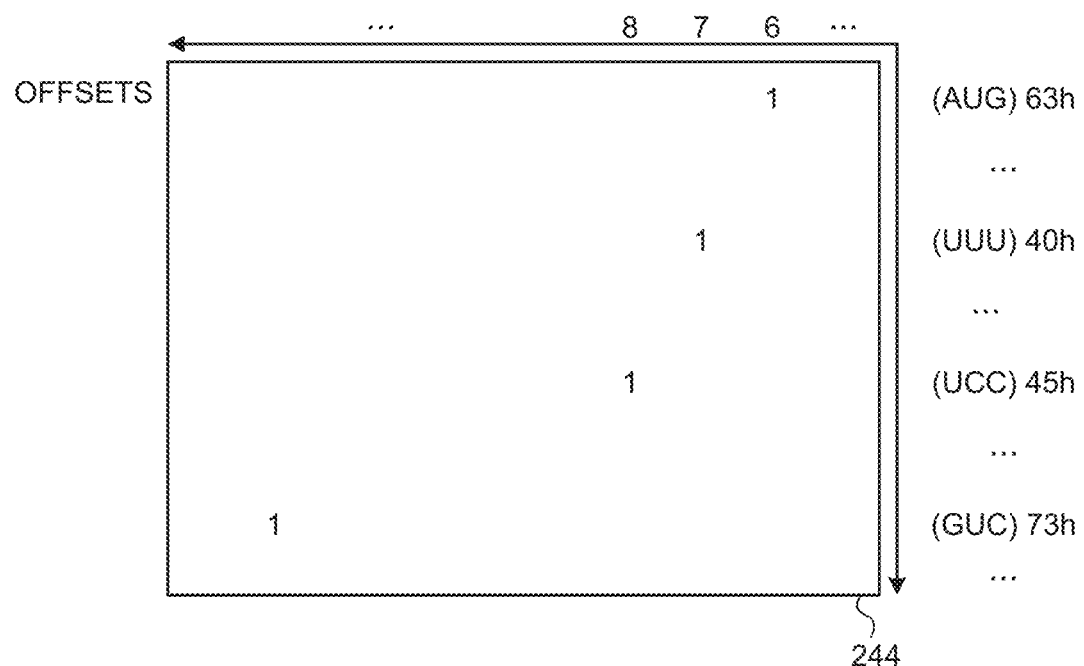
FIG. 23 is a drawing illustrating an example of a data structure of a codon transposition index.

The codon transposition index 244 is information keeping offsets from the head of the codon compression file 243 and types of codons (the codon symbols) in correspondence with each other. FIG. 23 is a drawing illustrating an example of a data structure of the codon transposition index. In FIG. 23, the horizontal axis of the codon transposition index 244 is an axis corresponding to the offsets. The vertical axis of the codon transposition index 244 is an axis corresponding to the types of codons (the codon symbols). The codon transposition index 244 is expressed with a bitmap of "0" or "1". In an initial state, the entire bitmap is set to "0".

For example, the offset of the codon symbol at the head of the codon compression file 243 is set to "0". When the codon symbol "(AUG)63h" is contained at the seventh position from the head of the codon compression file 243, the bit is set to "1" at the position where the column of the offset "6" intersects the line of the codon symbol "(AUG)63h" in the codon transposition index 244.

The protein dictionary 245 is information in which information about proteins and codon symbol sequences corresponding to the proteins are kept in correspondence with each other. FIG. 24 is a table illustrating an example of a data structure of the protein dictionary. As illustrated in FIG. 24, the protein dictionary 245 keeps the protein information, amino acid symbol sequences, and the codon symbol sequences in correspondence with one another.

The protein information contains the "symbols" of the proteins, "groups" to which the proteins belong, and the "names" of the proteins. Each of the amino acid symbol sequences is a sequence of amino acid symbols corresponding to the symbol of a protein (the type of protein). Each of the codon symbol sequences is a sequence of codon symbols corresponding to the symbol of a protein (the type of protein).

For example, the protein "Type I collagen" belongs to the group "collagen" and has a symbol "8000h". The amino acid symbol sequence corresponding to the symbol "8000h" is "02h46h59h . . . 03h". The codon symbol sequence is "02h63h78h . . . 03h".

The protein HMM 246 keeps therein information about co-occurrence rates each of which is calculated between a protein and a category ID to which another protein that follows the protein belongs. FIG. 25 is a table illustrating an example of a data structure of the protein HMM. As illustrated in FIG. 25, the protein HMM 246 keeps the protein information and the co-occurrence rates in correspondence with each other.

The protein information contains "symbols" of proteins, "groups" to which the proteins belongs, and the "names" of the proteins. Under the co-occurrence rates, the co-occurrence rates between the proteins and the category IDs are set.

As an example, a record in the first line of the protein HMM 246 will be explained. The probability (a co-occurrence rate) that a protein following the protein symbol "8000h" will be a protein identified with the category ID "CL1" is "78%". The probability (a co-occurrence rate) that a protein following the protein symbol "8000h" will be a protein identified with the category ID "CL2" is "63%.". The probability (a co-occurrence rate) that a protein following the protein symbol "8000h" will be a protein identified with the category ID "CL3" is "1%". The probability (a co-occurrence rate) that a protein following the protein symbol "8000h" will be a protein identified with the category ID "CL4" is "2%".

The dictionary index 247 is information keeping offsets of breaks in the codon symbol sequences (blocks of the codon symbol sequences corresponding to the proteins) contained in the codon compression file 243. For example, in the dictionary index 247, each of the breaks is expressed with an offset from the head of the codon compression file 243. In the second embodiment, as an example, each of the breaks is expressed with an offset of the codon symbol at the head of the codon symbol sequence that follows. Further, in addition to the codon symbol sequences, it is also acceptable to keep the breaks in correspondence with amino acid symbol sequences (which will be omitted hereinafter).

Figure 26:
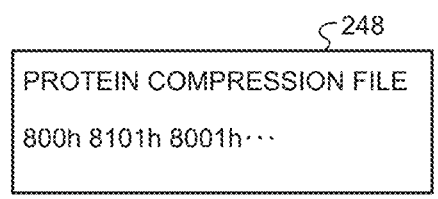
FIG. 26 is a drawing illustrating an example of a data structure of a protein compression file.

The protein compression file 248 is a file keeping information in which a plurality of protein symbols are arranged in a sequence. FIG. 26 is a drawing illustrating an example of a data structure of the protein compression file. As illustrated in FIG. 26, the protein compression file 248 is information in which symbols in units of proteins are arranged in the sequence.

Figure 27:
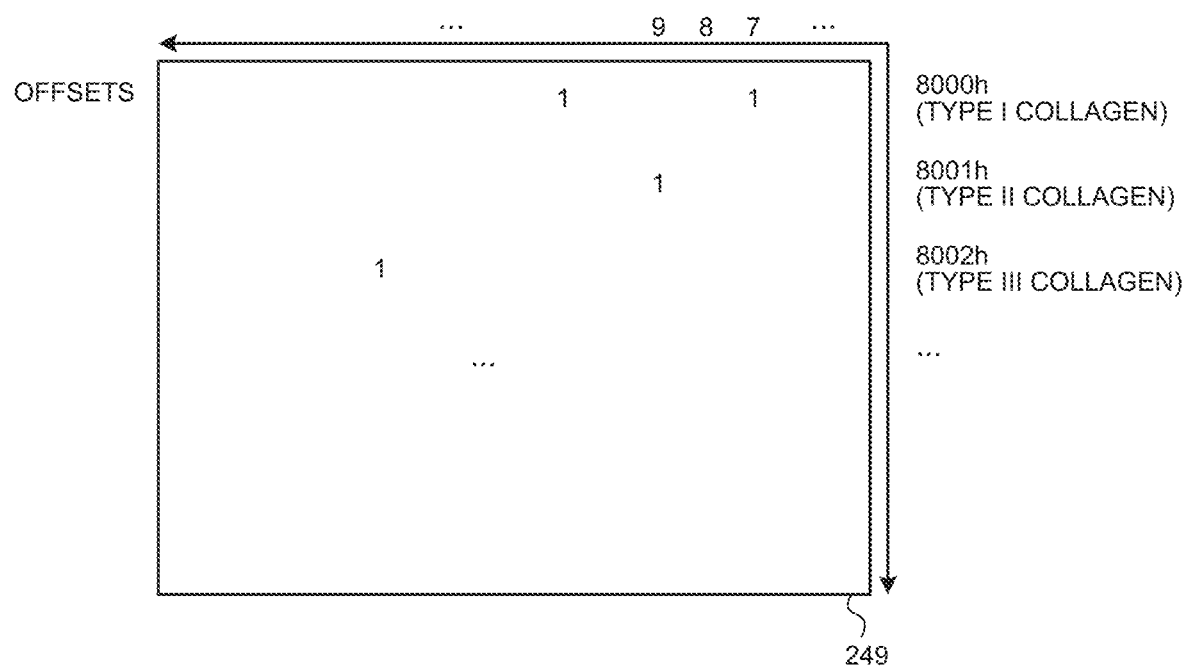
FIG. 27 is a drawing illustrating an example of a data structure of a protein transposition index.

The protein transposition index 249 is information keeping offsets from the head of the protein compression file 248 and types of proteins (the protein symbols) in correspondence with each other. FIG. 27 is a drawing illustrating an example of a data structure of the protein transposition index. In FIG. 27, the horizontal axis of the protein transposition index 249 is an axis corresponding to the offsets. The vertical axis of the protein transposition index 249 is an axis corresponding to the types of proteins (the protein symbols). The protein transposition index 249 is expressed with a bitmap of "0" or "1". In an initial state, the entire bitmap is set to "0".

For example, the offset of the protein symbol at the head of the protein compression file 248 is set to "0". When the protein symbol "8000h (Type I collagen)" is contained at the eighth position from the head of the protein compression file 248, the bit is set to "1" at the position where the column of the offset "7" intersects the line of the protein symbol "8000h (Type I collagen)" in the protein transposition index 249.

The category table 250 is a table defining category IDs to which the proteins (the protein symbols) belong. FIG. 28 is a table illustrating an example of a data structure of the category table. As illustrated in FIG. 28, the category table 250 keeps the category IDs and the protein symbols in correspondence with each other. For example, the protein symbols such as "8000h", "8001h", "8002h", and so on are kept in correspondence with the category ID "CL1". The proteins kept in correspondence with mutually the same category ID are proteins having similar characteristics.

The vector table 251 keeps therein vectors assigned to the protein symbols. FIG. 29 is a table illustrating an example of a data structure of the vector table. As illustrated in FIG. 29, the vector table 251 keeps the protein symbols and the vectors in correspondence with each other. It is assumed that the vectors of the protein symbols are calculated in advance by using the technique called Poincare embeddings.

The controlling unit 260 includes a receiving unit 261, a first symbolizing unit 262, a second symbolizing unit 263, and an assigning unit 264. The controlling unit 260 is realized by using a CPU or an MPU, for example. Alternatively, the controlling unit 260 may be implemented by an integrated circuit such as an ASIC or an FPGA, for example.

The receiving unit 261 is a processing unit that obtains various types of information from an external apparatus (not illustrated) connected to a network, via the communication unit 210. For example, when having acquired the base file 241 from the external apparatus, the receiving unit 261 stores the base file 241 into the storage unit 240. In this situation, when the base file 241 is compressed by ZIP or the like, the receiving unit 261 decompresses the compressed base file 241.

The first symbolizing unit 262 is a processing unit that generates the codon compression file 243, on the basis of the base file 241 and the conversion table 242. The first symbolizing unit 262 takes out three bases at a time from the base file 241 and identifies a symbol corresponding to the three bases (a codon) that were taken out, by comparing the three bases with the conversion table 242, so as to convert the three bases into the symbol. For example, the first symbolizing unit 262 converts the codon "AUG" into a symbol "63h". By repeatedly performing the process described above, the first symbolizing unit 262 generates the codon compression file 243.

At the time of generating the codon compression file 243, the first symbolizing unit 262 generates the codon transposition index 244. For example, the first symbolizing unit 262 sets "1" in a bitmap of the codon transposition index 244 corresponding to the codon symbol resulting from the conversion and the offset of the symbol in the codon compression file 243.

The second symbolizing unit 263 is a processing unit that generates the protein compression file 248 and the protein transposition index 249.

On the basis of the dictionary index 247, the second symbolizing unit 263 identifies breaks in the codon symbol sequences of the proteins contained in the codon compression file 243. On the basis of the codon symbol sequences between the breaks and the protein dictionary 245, the second symbolizing unit 263 identifies the protein symbols corresponding to the codon symbol sequences between the breaks and converts the codon symbol sequences into the protein symbols.

In this situation, when a codon symbol sequence that follows a protein symbol (a break) corresponds to a plurality of protein symbols, the second symbolizing unit 263 identifies, on the basis of the protein HMM 246, a protein symbol having the highest co-occurrence rate among the corresponding plurality of protein symbols.

Figure 30:
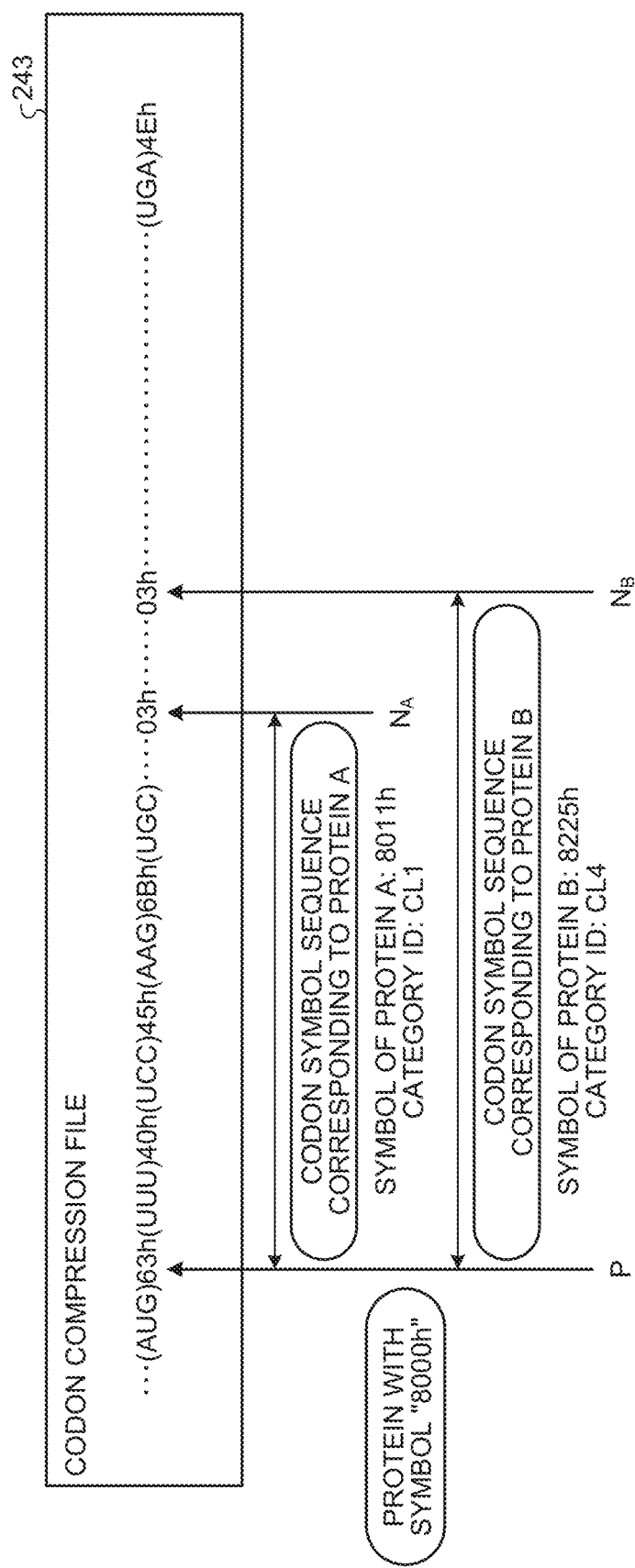
FIG. 30 is a diagram for explaining a process performed by a second symbolizing unit.

FIG. 30 is a diagram for explaining the process performed by the second symbolizing unit. As illustrated in FIG. 30, there may be a situation in which the codon symbol sequence from an offset P at a certain break to another offset $N_A$ in the codon compression file 243 corresponds to the symbol (e.g., 8011h) of protein A, whereas the codon symbol sequence from the offset P to yet another offset $N_B$ corresponds to the symbol (e.g., 8225h) of protein B. In this situation, let us assume that the symbol of the immediately preceding protein is "8000h".

By comparing the symbol "8011h" of protein A with the category table 250, the second symbolizing unit 263 identifies the category of protein A with the category ID "CL1". By comparing the symbol "8225h" of protein B with the category table 250, the second symbolizing unit 263 identifies the category of protein A with the category ID "CL4".

By comparing the symbol "8000h" of the previous protein and the category ID "CL1" with the protein HMM 246, the second symbolizing unit 263 identifies the co-occurrence rate of "78%". By comparing the symbol "8000h" of the previous protein and the category ID "CL4" with the protein HMM 246, the second symbolizing unit 263 identifies the co-occurrence rate of "2%".

Because the co-occurrence rate between the protein symbol "8000h" and the category ID "CL1" is larger than the co-occurrence rate between the protein symbol "8000h" and the category ID "CL4", the second symbolizing unit 263 identifies the protein symbol following the symbol "8000h" as "8011h". The second symbolizing unit 263 converts the codon symbol sequence on the basis of the identified symbol "8011h". For example, the second symbolizing unit 263 generates the protein compression file 248, by repeatedly performing the process described above, by determining the codon symbols from the offsets P to "P+$N_A$" illustrated in FIG. 30 as the symbol of protein A and using the offset "P+$N_A$+1" as a break.

At the time of generating the protein compression file 248, the second symbolizing unit 263 generates the protein transposition index 249. The protein transposition index 249 is information keeping the offsets from the head of the protein compression file 248 and the protein symbols in correspondence with each other.

The assigning unit 264 is a processing unit that assigns vectors to the protein symbols, by comparing the protein symbols contained in the protein compression file 248 with the vector table 251. The assigning unit 264 may calculate a vector of the protein compression file 248, by integrating together the vectors assigned to the protein symbols contained in the protein compression file 248.

Figure 31:
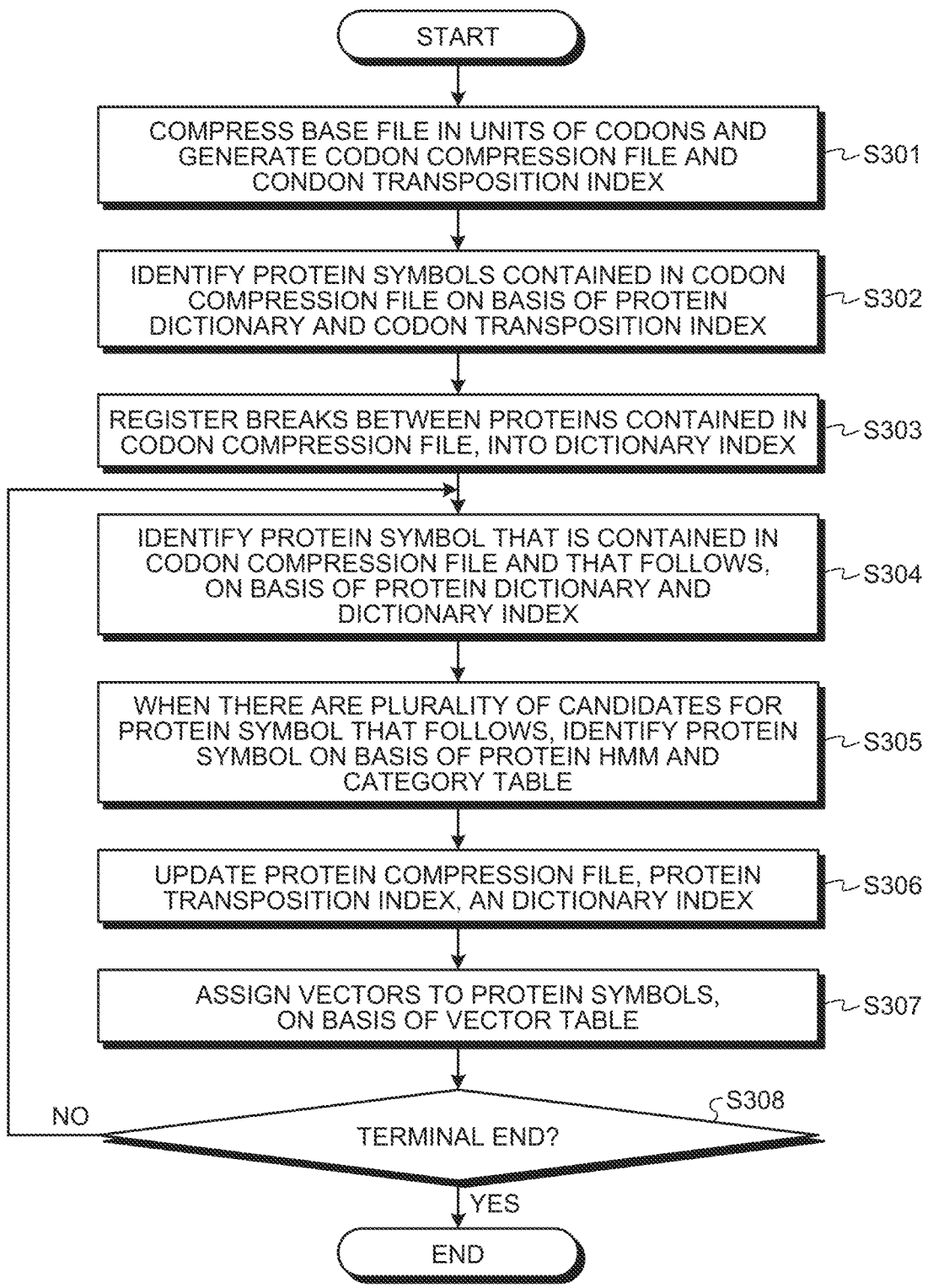
FIG. 31 is a flowchart illustrating a processing procedure of the information processing apparatus according to the second embodiment.

Next, an example of a processing procedure of the information processing apparatus 200 according to the second embodiment will be explained. FIG. 31 is a flowchart illustrating the processing procedure of the information processing apparatus according to the second embodiment. As illustrated in FIG. 31, the first symbolizing unit 262 of the information processing apparatus 200 generates the codon compression file 243 and the codon transposition index 244 by compressing the base file 241 in units of codons (step S301).

The second symbolizing unit 263 of the information processing apparatus 200 identifies the protein symbols contained in the codon compression file 243, on the basis of the protein dictionary 245 and the codon transposition index 244 (step S302).

The second symbolizing unit 263 registers the breaks of the proteins contained in the codon compression file 243, into the dictionary index 247 (step S303). On the basis of the protein dictionary 245 and the dictionary index 247, the second symbolizing unit 263 identifies the protein symbol that is contained in the codon compression file 243 and that follows (step S304).

When there are a plurality of candidates for the protein symbol that follows, the second symbolizing unit 263 identifies the protein symbol, on the basis of the protein HMM 246 and the category table 250 (step S305).

The second symbolizing unit 263 updates the protein compression file 248, the protein transposition index 249, and the dictionary index 247 (step S306). On the basis of the vector table 251, the assigning unit 264 of the information processing apparatus 200 assigns vectors to the protein symbols (step S307).

When the terminal end has not been reached (step S308: No), the information processing apparatus 200 proceeds to step S304. On the contrary, when the terminal end has been reached (step S308: Yes), the information processing apparatus 200 ends the process.

Next, advantageous effects of the information processing apparatus 200 according to the second embodiment will be explained. On the basis of the protein HMM 246 defining the co-occurrence rates between the proteins and the categories of the proteins, the information processing apparatus 200 identifies the types of the proteins contained in the base file 241 and assigns the vectors thereto. As a result, even when it is not possible to identify the types of the proteins contained in the base file 241 in one-to-one correspondence, it is possible to identify the accurate types of proteins by using the co-occurrence rates and to thus assign the appropriate vectors.

Further, on the basis of similarities among the proteins, the information processing apparatus 200 classifies the proteins under the category IDs in advance and performs the process by using the protein HMM 246 defining the co-occurrence rates between the proteins and the category IDs. Consequently, in comparison to the situation where a co-occurrence rate is defined for each protein of HMMs, it is possible to make the data amount of the protein HMM 246 smaller. In addition, by using the HMM kept in correspondence with the categories, it is possible to reduce the number of times of referencing on average and to thus make the processing faster.

Further, although the information processing apparatus 200 according to the second embodiment assigns the vectors to the proteins contained in the base file 241, by using the protein HMM 246 defining the co-occurrence rates related to the proteins, possible embodiments are not limited to this example. For instance, the information processing apparatus 200 may assign vectors to primary structures of the proteins contained in the base file 241 by using a primary structure HMM defining co-occurrence rates related to the primary structures of the proteins.

Further, it is also possible to apply the invention of the present disclosure not only to the base file 241, but also to a chemical structure formula file containing chemical structure formulae. The chemical structure formula file contains a plurality of functional groups. At the time of assigning vectors to the functional groups, when there are a plurality of candidates for a functional group, the information processing apparatus 200 may identify a functional group having high frequency of appearance by using a functional group HMM so as to assign a vector corresponding to the identified functional group. Further, mutually the same category ID may be assigned to a plurality of similar functional groups, so as to reduce the data of the functional group HMM.

Figure 32:
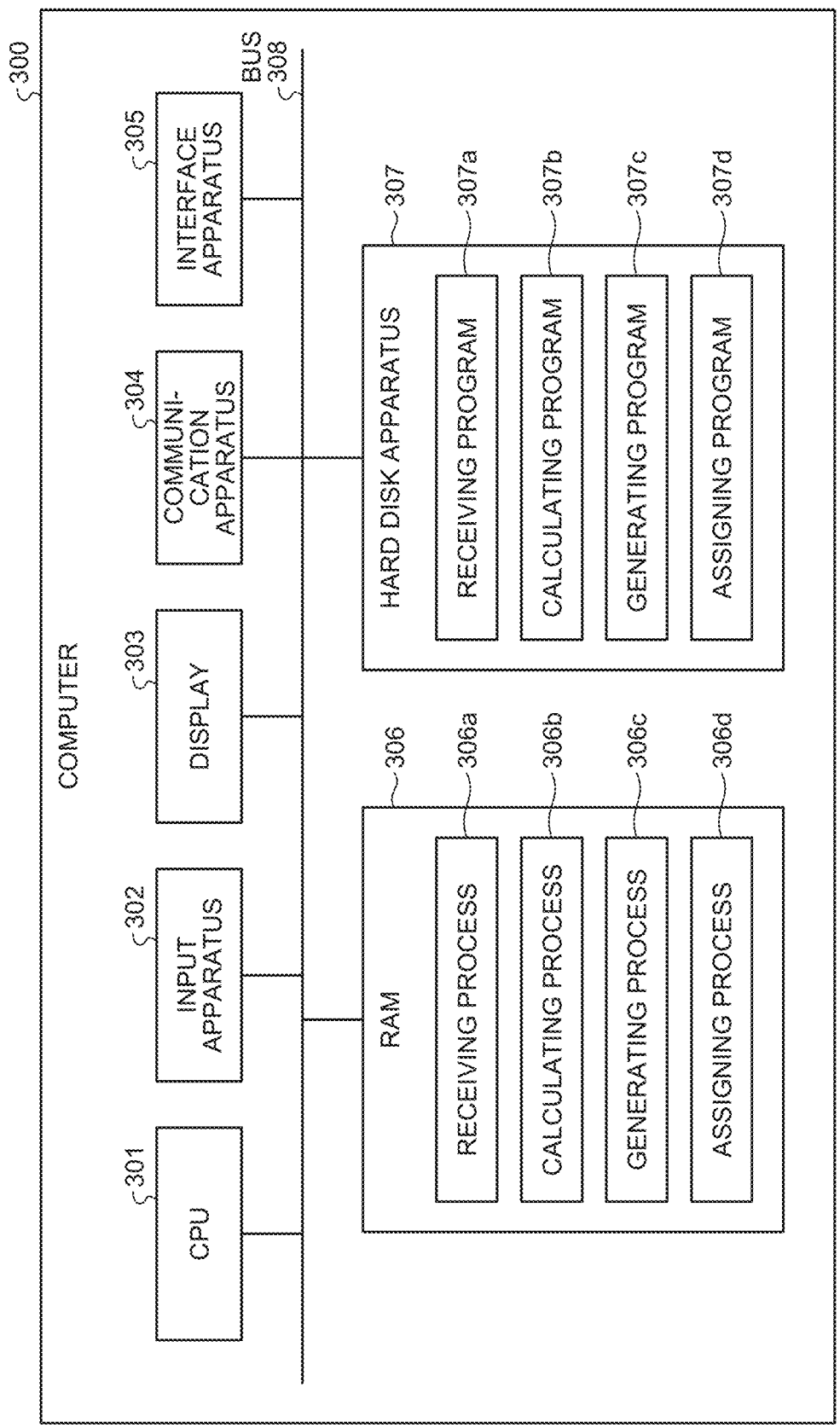
FIG. 32 is a diagram illustrating an example of a hardware configuration of a computer that realizes the same functions as those of the information processing apparatus according to the first embodiment.

Next, an example of a hardware configuration of a computer that realizes the same functions as those of the information processing apparatus 100 described in the first embodiment will be explained. FIG. 32 is a diagram illustrating the example of the hardware configuration of the computer that realizes the same functions as those of the information processing apparatus according to the first embodiment.

As illustrated in FIG. 32, a computer 300 includes: a CPU 301 that performs various types of computation processes, an input apparatus 302 that receives inputs of data from a user, and a display 303. Further, the computer 300 includes: a communication apparatus 304 that gives and receives data to and from an external apparatus or the like via a wired or wireless network and an interface apparatus 305. Also, the computer 300 includes: a RAM 306 that temporarily stores therein various types of information and a hard disk apparatus 307. Furthermore, the apparatuses 301 to 307 are connected to a bus 308.

The hard disk apparatus 307 includes a receiving program 307a, a calculating program 307b, a generating program 307c, and an assigning program 307d. Further, the CPU 301 reads the programs 307a to 307d and loads the read programs into the RAM 306.

The receiving program 307a functions as a receiving process 306a. The calculating program 307b functions as a calculating process 306b. The generating program 307c functions as a generating process 306c. The assigning program 307d functions as an assigning process 306d.

Processing of the receiving process 306a corresponds to the processing of the receiving unit 151. Processing of the calculating process 306b corresponds to the processing of the calculating unit 152. Processing of the generating process 306c corresponds to the processing of the generating unit 153. Processing of the assigning process 306d corresponds to the processing of the assigning unit 154.

Further, the programs 307a to 307d do not necessarily have to be stored in the hard disk apparatus 307 from the beginning. For example, it is acceptable to have the programs stored in a "portable physical medium" such as a Flexible Disk (FD), a Compact Disk Read-Only Memory (CD-ROM), a Digital Versatile Disk (DVD), a magneto-optical disk, or an Integrated Circuit (IC) card, to be inserted into the computer 300. Further, the computer 300 may be configured to read and execute the programs 307a to 307d.

Figure 33:
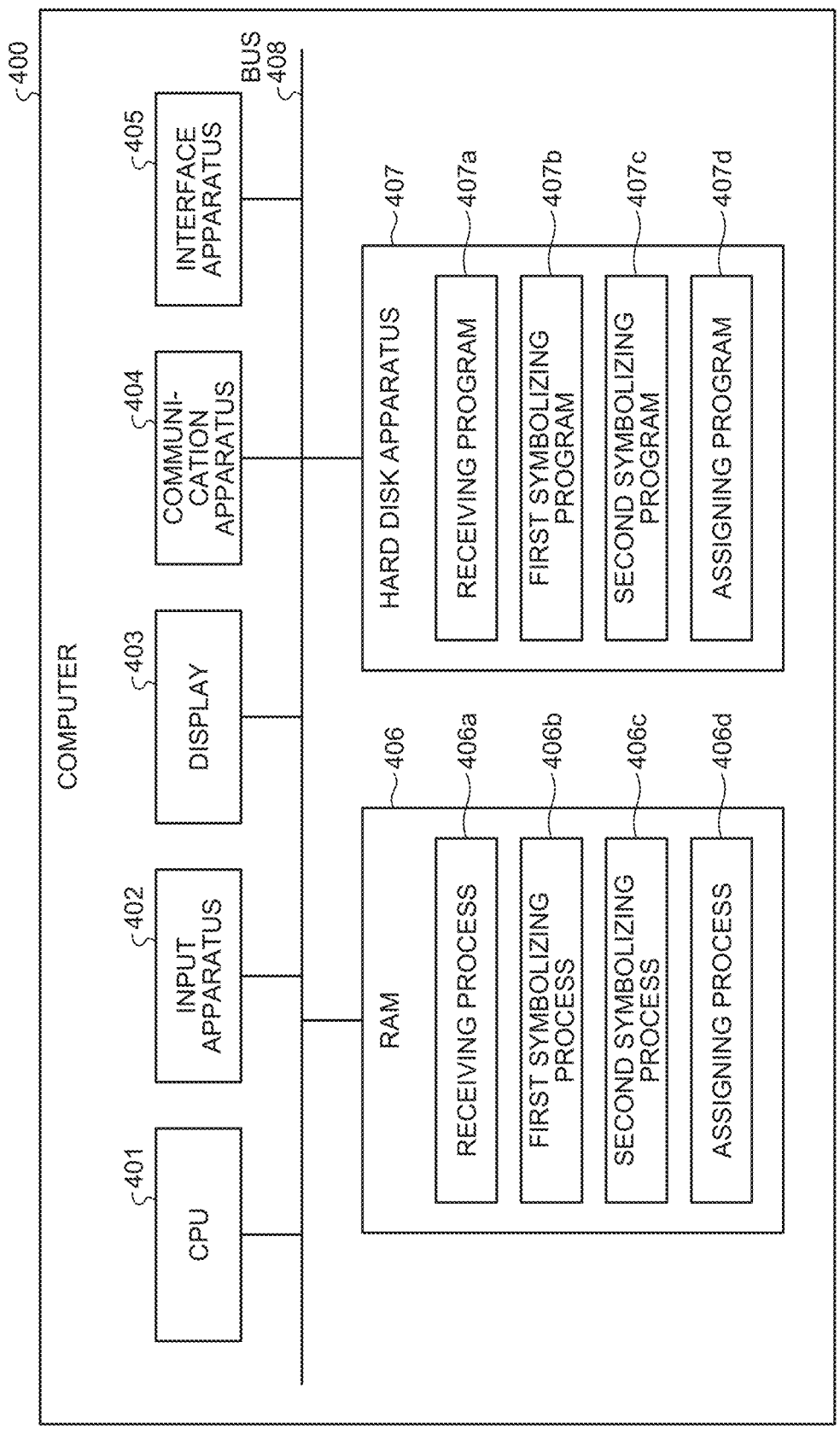
FIG. 33 is a diagram illustrating an example of a hardware configuration of a computer that realizes the same functions as those of the information processing apparatus according to the second embodiment.

Next, an example of a hardware configuration of a computer that realizes the same functions as those of the information processing apparatus 200 described in the second embodiment will be explained. FIG. 33 is a diagram illustrating the example of the hardware configuration of the computer that realizes the same functions as those of the information processing apparatus according to the second embodiment.

As illustrated in FIG. 33, a computer 400 includes: a CPU 401 that performs various types of computation processes, an input apparatus 402 that receives inputs of data from a user, and a display 403. Further, the computer 400 includes: a communication apparatus 404 that gives and receives data to and from an external apparatus or the like via a wired or wireless network and an interface apparatus 405. Also, the computer 400 includes: a RAM 406 that temporarily stores therein various types of information and a hard disk apparatus 407. Furthermore, the apparatuses 401 to 407 are connected to a bus 408.

The hard disk apparatus 407 includes a receiving program 407a, a first symbolizing program 407b, a second symbolizing program 407c, and an assigning program 407d. Further, the CPU 401 reads the programs 407a to 407d and loads the read programs into the RAM 406.

The receiving program 407a functions as a receiving process 406a. The first symbolizing program 407b functions as a first symbolizing process 406b. The second symbolizing program 407c functions as a second symbolizing process 406c. The assigning program 407d functions as an assigning process 406d.

Processing of the receiving process 406a corresponds to the processing of the receiving unit 261. Processing of the first symbolizing process 406b corresponds to the processing of the first symbolizing unit 262. Processing of the second symbolizing process 406c corresponds to the processing of the second symbolizing unit 263. Processing of the assigning process 406d corresponds to the processing of the assigning unit 264.

Further, the programs 407a to 407d do not necessarily have to be stored in the hard disk apparatus 307 from the beginning. For example, it is acceptable to have the programs stored in a "portable physical medium" such as a Flexible Disk (FD), a CD-ROM, a DVD, a magneto-optical disk, or an IC card, to be inserted into the computer 400. Further, the computer 400 may be configured to read and execute the programs 407a to 407d.

Advantageous Effects of Invention

It is possible to assign the appropriate vectors and to thus improve precision levels of analyses using the vectors.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:
   classifying a plurality of words contained in predetermined document data under categories defined in a thesaurus;
   generating a co-occurrence rate table based on a relationship between polysemous words contained in the predetermined document data and a category of words co-occurring with the polysemous words classified in a certain semantic division;
   separating input text into a plurality of words, by performing a morpheme analysis on the input text;
   identifying a category to which each of the plurality of words belongs;
   identifying, from among the plurality of words contained in the input text, a polysemous word and a semantic division of the polysemous word, based on the category identified and the co-occurrence rate table; and
   assigning a vector corresponding to the semantic division of the polysemous word, to the polysemous word contained in the input text.

2. The non-transitory computer-readable recording medium according to claim 1, wherein the process further includes:
   calculating vectors of words and vectors of the polysemous words distinguished according to the semantic divisions thereof, by carrying out Poincare embeddings, and assigning vectors to the polysemous word and to the words contained in the input text, based on a calculation result from the process of calculating the vectors.

3. The non-transitory computer-readable recording medium according to claim 2, wherein the process further includes: classifying a plurality of words contained in predetermined document data under categories defined in a thesaurus; and generating the co-occurrence rate table based on a relationship between polysemous words contained in the predetermined document data and a category of words co-occurring with the polysemous words classified in a certain semantic division.

4. The non-transitory computer-readable recording medium according to claim 3, wherein the process further includes: calculating word vectors of idiomatic expressions and field-specific terms by carrying out the Poincare embeddings.

5. A non-transitory computer-readable recording medium having stored therein an information processing program that causes a computer to execute a process comprising:
 identifying a plurality of protein candidates which are contained in a codon file having a plurality of codons arranged in a sequence and each of which has a start position in one of various positions;
 identifying a category indicating proteins to which have the same characteristics for each of the plurality of protein candidates belongs, respectively;
 identifying a protein having the highest appearance frequency from among the plurality of protein candidates, based on sets each made up of a different one of the categories to which the plurality of protein candidates respectively belong and a protein preceding the start position and based on a table defining frequency of appearance of a category to which a protein following a certain protein belongs with respect to proteins identified from sequences of the codons; and
 assigning a vector to the identified protein.

6. An information processing apparatus comprising:
 a memory; and
 a processor coupled to the memory and configured to:
 classify a plurality of words contained in predetermined document data under categories defined in a thesaurus;
 generate a co-occurrence rate table based on a relationship between polysemous words contained in the predetermined document data and a category of words co-occurring with the polysemous words classified in a certain semantic division;
 separate input text into a plurality of words, by performing a morpheme analysis on the input text;
 identify a category to which each of the plurality of words belongs;
 identify, from among the plurality of words contained in the input text, a polysemous word and a semantic division of the polysemous word, based on the category identified and the co-occurrence rate table; and
 assign a vector corresponding to the semantic division of the polysemous word, to the polysemous word contained in the input text.

7. The information processing apparatus according to claim 6, wherein the processor is further configured to:
 calculate vectors of words and vectors of the polysemous words distinguished according to the semantic divisions thereof by carrying out Poincare embeddings, and
 assign vectors to the polysemous word and to the words contained in the input text, based on a calculation result from the process of calculating the vectors.

8. The information processing apparatus according to claim 7, wherein the processor is further configured to:
 classify a plurality of words contained in predetermined document data under categories defined in a thesaurus and generate the co-occurrence rate table based on a relationship between polysemous words contained in the predetermined document data and a category of words co-occurring with the polysemous words classified in a certain semantic division.

9. The information processing apparatus according to claim 8, wherein the processor is further configured to: calculate word vectors of idiomatic expressions and field-specific terms by carrying out the Poincare embeddings.

* * * * *